United States Patent
Soane et al.

(10) Patent No.: US 6,570,714 B2
(45) Date of Patent: May 27, 2003

(54) PRECISION COMPOSITE ARTICLE

(75) Inventors: David S. Soane, Piedmont, CA (US); Michael R. Houston, Eagle River, WI (US); Toshiaki Hino, Berkeley, CA (US)

(73) Assignee: ZMS, LLC, Emeryville, GA (US)

( * ) Notice: Subject to any disclaimer, the term of this patent is extended or adjusted under 35 U.S.C. 154(b) by 0 days.

(21) Appl. No.: 10/004,455

(22) Filed: Dec. 5, 2001

(65) Prior Publication Data

US 2002/0091174 A1 Jul. 11, 2002

Related U.S. Application Data

(63) Continuation-in-part of application No. PCT/US01/04791, filed on Feb. 14, 2001, which is a continuation-in-part of application No. 09/505,260, filed on Feb. 16, 2000.

(51) Int. Cl.$^7$ .......................... G02B 25/00; B32B 27/00
(52) U.S. Cl. .................. 359/646; 264/1.1; 264/1.32; 264/1.36; 264/1.38; 264/1.7; 525/89; 525/90; 525/91; 525/92; 525/94; 525/98; 525/107; 525/123; 525/191; 525/330.3; 522/6; 428/441; 428/500; 428/515; 428/522
(58) Field of Search .................... 264/1.1, 1.32, 264/1.36, 1.38, 1.7; 525/89, 90, 91, 92, 94, 98, 107, 123, 191, 330.3; 522/6; 428/441, 500, 515, 522; 359/19, 362, 643, 646

(56) References Cited

U.S. PATENT DOCUMENTS

| | | |
|---|---|---|
| 3,557,046 A | 1/1971 | Muskat |
| 3,968,305 A | 7/1976 | Oshima et al. ............. 428/334 |
| 4,131,625 A | 12/1978 | Arnold et al. |
| 4,264,489 A | 4/1981 | Ibsen et al. .............. 260/42.52 |
| 4,323,636 A | 4/1982 | Chen ........................ 430/271 |
| 4,402,887 A | 9/1983 | Kuriyama et al. ............ 264/22 |
| 4,430,417 A | 2/1984 | Heinz et al. ................ 430/286 |
| 4,510,593 A | 4/1985 | Daniels |
| 4,524,162 A | 6/1985 | Domeier |
| 4,598,123 A | 7/1986 | Cutter ......................... 525/84 |
| 4,632,773 A | 12/1986 | Neefe .................... 252/301.35 |
| 4,698,373 A | 10/1987 | Tateosian et al. ............. 522/95 |
| 4,785,064 A | 11/1988 | Hegel |
| 4,837,289 A | 6/1989 | Mueller et al. ............. 526/279 |
| 4,981,912 A | 1/1991 | Kurihara |
| 5,006,415 A | 4/1991 | Matsumura et al. |
| 5,110,514 A | 5/1992 | Soane |
| 5,114,632 A | 5/1992 | Soane |
| 5,147,700 A | 9/1992 | Brüggemann et al. |
| 5,170,192 A | 12/1992 | Pettigrew et al. ........... 351/161 |
| 5,185,234 A | 2/1993 | Nakatsukasa et al. |
| 5,277,911 A | 1/1994 | Viegas et al. ............... 424/427 |
| 5,278,243 A | 1/1994 | Soane |
| 5,372,755 A | 12/1994 | Stoerr et al. .................. 264/1.7 |
| 5,449,703 A | 9/1995 | Mitra et al. |
| 5,723,541 A | 3/1998 | Ingenito et al. ............... 525/92 |
| 5,747,553 A | 5/1998 | Guzauskas |
| 5,779,943 A | 7/1998 | Enns et al. |
| 5,851,328 A | 12/1998 | Kohan ........................ 264/1.7 |
| 5,907,386 A | 5/1999 | Gupta et al. ................. 351/177 |
| 5,914,174 A | 6/1999 | Gupta et al. ................. 428/174 |
| 5,938,876 A | 8/1999 | Edwards et al. |
| 6,074,579 A | 6/2000 | Greshes ...................... 264/1.7 |
| 6,075,094 A | 6/2000 | Amekawa |
| 6,111,012 A | 8/2000 | Fischer et al. |
| 6,140,450 A | 10/2000 | Ishikawa et al. |
| 6,225,406 B1 | 5/2001 | Wang et al. |
| 6,241,922 B1 | 6/2001 | Bishop et al. ............... 264/1.7 |
| 6,270,699 B1 | 8/2001 | Fujita ......................... 264/2.7 |
| 6,265,499 B1 | 7/2002 | Nagino et al. ................ 526/65 |

FOREIGN PATENT DOCUMENTS

| | | |
|---|---|---|
| EP | 0 106 641 | 4/1984 |
| EP | 0 238 863 | 9/1987 |
| EP | 0 490 448 A1 | 6/1992 |
| GB | 498 679 | 2/1939 |
| GB | 557 432 | 6/1946 |
| GB | 2 257 978 | 1/1993 |
| WO | WO 93/21010 | 10/1993 |
| WO | WO 98/13403 A1 | 4/1998 |
| WO | WO 00/17675 | 3/2000 |
| WO | WO 00/55653 | 9/2000 |

OTHER PUBLICATIONS

Search Report, Jul. 6, 2001, International Patent Appln. PCT/US01/04791, "Precision Composite Articles"; ZMS LLC, David S. Soane, et al., applicants.

*Primary Examiner*—Samuel A. Acquah
(74) *Attorney, Agent, or Firm*—Jacqueline S. Larson

(57) ABSTRACT

The invention is directed to a method for making composite articles, including optical lenses, which includes the steps of obtaining a substrate; placing a semi-solid-like polymerizable composition in contact with at least one of the front or back surface of the substrate; compressing or heating the resulting semi-solid/substrate sandwich between two mold halves, where the mold contacting the semi-solid polymerizable material has a desired surface geometry; and exposing the semi-solid/substrate sandwich to a source of polymerizing energy. The resulting composite article has the desirable characteristics of the substrate but is also easily fabricated as a result of the semi-solid molding process. Also included within the present invention is a composite article comprising a substrate portion and at least one layer of a cured resin bonded to the substrate portion, the cured resin comprising an interpenetrating crosslinked polymer network of reactive plasticizer within a dead polymer. In one embodiment, the reactive plasticizer polymer network is further crosslinked to the dead polymer. The composite article exhibits dimensional stability and high-fidelity replication of an internal mold cavity.

38 Claims, No Drawings

PRECISION COMPOSITE ARTICLE

This is a continuation-in-part application of International application No. PCT/US01/04791, filed on Feb. 14, 2001 and designating the United States of America, which is a continuation-in-part application of application Ser. No. 09/505,260, filed on Feb. 16, 2000; the entire disclosures of which are incorporated herein by reference.

FIELD OF THE INVENTION

This invention is related to the fields of polymerization and molding. More particularly, it is related to a process for quickly and inexpensively producing an optical quality lens or other transparent optic on an underlying substrate. It is also related to optimal materials of construction and to the resulting composite structure.

BACKGROUND OF THE INVENTION

Ophthalmic lenses are used to correct vision by changing the focal length of the light rays entering the pupil of an eyeglass-wearer. When the patient is near-sighted or far-sighted, the correction is rather simply made using a single vision lens in which the outer and inner surfaces of the lens are both spherical, but have different radii of curvature. An added level of complication occurs when a patient exhibits astigmatism in one or both eyes. In this case the back surface of the lens is made toroidal by imposing two different radii of curvature on the same surface. In order to properly correct for astigmatism, the rotational position of the toroidal surface must be fixed with respect to the pupil of the eyeglass-wearer (typically accomplished with the eyeglass frames). Patients who require multi-vision lenses, such as bifocals and progressives, introduce yet another level of complication. In this case, a bifocal or progressive pocket (an "add" pocket) is molded into the front surface of the lens, providing a lens that corrects to various focal lengths across the lens depending on the spatial distribution of the add pocket. The most common example of this is someone who is both near-sighted (needs eyeglasses to see objects at a distance) and far-sighted (needs a bifocal pocket to read text).

When a patient needs both multi-vision lenses and astigmatic correction, the toroidal back surface must be fixed rotationally with respect to the location and orientation of the bifocal pocket. This presents an obstacle to high-throughput manufacturing of plastic ophthalmic lenses for reasons that will be discussed below.

Polycarbonate is widely used as an optical material for the production of ophthalmic lenses. It has a refractive index of 1.586, reasonably good light transmission, and extremely good impact resistance. Imparting scratch resistance to polycarbonate lenses must typically be accomplished with a secondary coating.

Polycarbonate ophthalmic lenses are formed by injection molding. Injection molding is a process that requires high injection and clamping pressures. As a result, molds are quite expensive for industrial-scale equipment. In addition, changing molds from one to another is time-consuming and involves a significant amount of down-time for the injection molding system, as well as significant start-up time before obtaining quasi-steady-state operation.

Typical ophthalmic lenses have a prescription range of +2 to −6 diopters in ¼ diopter increments, a bifocal pocket of 0 to +3 diopters in ½ increments, and an astigmatic correction from 0 to 2 in ¼ increments and a specified rotational angle of 0 to 90 degrees in 1-degree increments. Thus, taking into account all of the possible variations, there are roughly $10^5$ different prescriptions possible. In terms of injection molding, there would have to be approximately 150 different front molds and 720 different back molds in order to accommodate the prescription ranges covering multi-vision lenses with astigmatic correction. These numbers increase even more when other design features such as aspherical lenses or progressives are considered. The high-volume production of polycarbonate lenses with only a few variations can be quite economical. However, since molds are expensive and change-out time is excessive, injection molding of multi-vision lenses incorporating astigmatic corrections is not practical due to the large number of variations. Even if such a manufacturing process could be economically carried out, long tooling change-out times would require stocking the entire range of prescriptions, adding substantially to the cost of the lens. When the number of substrate variations is small, they may be produced economically by injection molding or other techniques. Thus, what is needed in order to produce the relatively large number of prescription variations is a method by which a lens or lens blank (i.e., substrates) can be imparted with either the desired back toroidal surface or the desired front multi-focal surface after the substrate fabrication process. While some work has been done in this area (e.g., U.S. Pat. Nos. 4,873,029 and 5,531,940), the resins used have been liquids, which creates a new set of problems and complexities in keeping the liquid resins in place in a mold prior to cure.

A further difficulty in the ophthalmics industry relates to the production of photochromic lenses, said lenses incorporating photochromic dyes that undergo a change in color upon exposure to sunlight. Unfortunately, photochromic dyes are well known to be sensitive to the lens manufacturing processes. Either the dyes are attacked or degraded by the peroxide initiators used to polymerize the lens casting resins, or the dyes lose their activity upon incorporation into the lens material due to steric hindrances or other factors. In an attempt to circumvent these problems, the dyes are often added after lens fabrication by means of an "imbibition" process in which the dyes are imbibed or absorbed partially into the lens in a hot water bath. In this case, long soaking times at high temperatures and softer lens materials must often be used in order to achieve acceptable dye uptake. The resultant thin layer of photochromic dye concentrated in the near-surface region of the lens shows problematic behavior in terms of both degree of tint obtained in the darkened state, as well as fatigue of the photochromic dye over time.

To overcome these performance limitations, polymer matrices have been developed that successfully incorporate photochromic dyes throughout the lens material during the fabrication process (see for example, Henry and Vial, U.S. Pat. No. 6,034,193). However, the resultant material is relatively expensive since the photochromic dye is dispersed throughout the material. Because the product is typically a semi-finished lens blank, of which 20–90% may be ground away during the subsequent surfacing process, much of the valuable photochromic dye is discarded and photochromic lenses produced by this technique are expensive. Thus, it would be desirable if the photochromic-containing material could be applied to the lens surface in such a way as to provide a layer of material to the front surface of the lens such that very little or none of the photochromic containing material was lost during surfacing. Further, it would be desirable if such a layer could be approximately 0.3 mm to 2.0 mm thick, such that photobleaching and/or fatigue problems over the lifetime of the lens were minimized.

Yet another problem in the ophthalmics industry concerns the production of polarized lenses. Such lenses are currently produced by fixing a polarizing film within a gasketed mold assembly, filling the mold on both sides of the polarizing film with a curable liquid resin, then curing the resin to produce a semi-finished lens blank with an embedded polarizing film. This approach is problematic because in order to achieve a thin final lens product, the spacing between the polarizing film and the lens molds must be kept small (approximately 1 mm , but preferably less than 1 mm ) in order to produce a finished lens of acceptable thickness. Small spacings between the film and molds present difficulties in keeping the film in place due to capillary forces. Fill-time delay and incorporation of bubbles are other problems associated with this manufacturing scheme. Additionally, since the liquid casting resins typically used in this process shrink anywhere from about 7% to about 15% or more, there can be a large stress gradient at the interface between the polarizing film and the cured resin. Since stress gradients at interfaces typically hinder the adhesion between two surfaces, lenses manufactured by this processing scheme often suffer from delamination failures.

Alternatively, lens substrates formed by casting, injection molding, or other techniques can be bonded to both sides of the polarizing film using optical adhesives. Such a processing scheme for multi-focal lenses in outlined in U.S. Pat. No. 5,351,100 by Schwenzfeier and Hanson, for example. Unfortunately, production of finished lenses of acceptable thickness requires that the starting lens substrates be relatively thin. Because the lens substrates must be quite thin (at least 1 mm , preferably about 0.5 mm ), they are flimsy and difficult to handle. This leads to a difficult bonding process using optical adhesives, especially since the adhesive layer must be kept very thin so as to not add to the overall thickness of the final lens, and low yields often result from this processing scheme. What is needed is a method by which lenses with an embedded polarizing film may be manufactured economically and with a thin profile, equal to at least about 2 mm , more preferably equal to or less than about 1.5 mm.

There is a problem in the optics industry in the manufacture of cemented doublet lenses. Doublets and higher order composite lens systems are used to achieve color correction and other functions in optical display systems. Such lenses consist of two lenses, each having ostensibly one surface that approximately matches the surface curvature of the other so that the two lenses may be bonded together, usually with the aid of an optical adhesive. However, placing the optical adhesive between the lenses and getting them bonded together at the appropriate angle, spacing, and with no bubbles or defects in the space between the two lenses is very complicated, and results in low-yield manufacturing processes. Unfortunately, the lenses are very valuable and a single defect means that both lenses must be discarded. It would be desirable to have a method by which "cemented doublets" or higher order lens composites or their equivalents could be manufactured without the difficulties associated with optical adhesives and bonding the two lenses together.

Finally, a problem within the photonics industry is the difficulty associated with the production of optics on the surface of electronic devices. When an electronic device such as a microchip consists of one or only a few devices (such as LED, for example), then the chip is relatively stable with respect to any external stresses that may be applied during encapsulation, handling, and in-use. This is evidenced by the facile production of single LED devices encapsulated by a thermoplastic shell that is molded so as to provide collimating optics for the LED device on the surface of the chip. However, when it becomes desirable to encapsulate and provide optics for an array of devices all on the same chip, current manufacturing processes are much less suitable. This is because larger chip sizes (approximately 1 $cm^2$ or larger, for example) become much more fragile as the chip size increases. Larger chips are also much more valuable. Thus, high pressure injection molding techniques currently used to encapsulate single LEDs or other small microchips are not suitable for larger chip sizes. Such techniques also require high temperatures in order to reduce the viscosity of the thermoplastic resins used in such processes, even with the high pressures typically used in order to achieve flow of the material, which presents further hazards to the valuable electronic devices.

Attempts to cast optical components onto the chip surface are, unfortunately, hindered by the high shrinkage associated with the curing of such curable liquid resins, not to mention the difficulty in liquid handling and gasketing required. The shrinkage resulting from cure leads to a high stress level at the interface between the substrate and the optics, yielding stressed substrates and poor adhesion between the substrate and the cast resin.

Thus, it would be desirable to have a means by which optical components, encapsulating or otherwise, could be formed on the surface of a substrate without undue shrinkage of the encapsulating material. Further, in order to prevent damage to the substrate, it would be desirable to avoid the use of high-pressure, high-temperature injection molding processes. In addition, elimination of the difficulties associated with liquid handling, and the gasketing assemblies therefore required, would further benefit the creation of optical component-electronic device composites.

SUMMARY OF THE INVENTION

The present invention is aimed at alleviating or reducing the above-stated problems. The invention is directed to a method and materials suitable for use therewith that allow for the facile formation of lenses or other optical components (i.e., superstrates) directly on the surface of a substrate. The superstrate formation process occurs at low temperatures and pressures compared to the processing of pure thermoplastics, and can be accomplished rapidly in a high-throughput manufacturing scheme. The materials used are advantageously designed to exhibit low shrinkage upon cure compared to curable liquid formulations known in the art, resulting in excellent adhesion properties on a wide variety of substrates.

More particularly, the process of the invention includes the steps of obtaining a substrate; placing a semi-solid-like polymerizable material in contact with at least one of the front or back surfaces of the substrate and/or with a mold surface, the polymerizable material comprising a reactive plasticizer, an initiator and, optionally, a dead polymer; compressing and/or heating the resulting semi-solid/substrate sandwich within a mold assembly, where the mold contacting the semi-solid polymerizable material has a desired surface geometry; and exposing the semi-solid/substrate sandwich to a source of polymerizing energy (which simultaneously cures and hardens the semi-solid polymerizable material), to yield the finished article, which is a composite sandwich of one or more previously semi-solid layers permanently bonded a substrate.

With respect to ophthalmic lenses, the present invention is directed to a fabrication method whereby the beneficial properties of polycarbonate (especially the impact resistance) or other optical quality materials may be realized in multi-focal lenses, without the drawbacks of injection-molding or mechanically grinding a wide variety of lens prescriptions. The method makes use of a polycarbonate or other desirable substrate that is sandwiched with one or more semi-solid polymerizable materials to give a composite lens having a desired geometry and configuration. Substrate materials may be chosen to give good impact resistance, elasticity, photochromic behavior, etc. Alternatively, the superstrate materials of this invention may be formulated to give good impact resistance, elasticity, photochromic behavior, etc. The resulting composite lens may have exceptional impact resistance when incorporating a polycarbonate substrate, but is also easily fabricated with both toroidal curves and multi-focal pockets as a result of the semi-solid molding process. Other beneficial properties, such as photochromic or polarizing behavior, may be included by appropriate choice of the substrate or semi-solid material(s).

Also included in the present invention is a composite optical article comprising a substrate and at least one layer or superstrate of a cured resin permanently bonded to the substrate, the cured resin comprising a semi-interpenetrating crosslinked polymer network of reactive plasticizer within an entangled dead polymer. In one embodiment, the reactive plasticizer polymer network is further crosslinked to the dead polymer. The substrate and superstrate portions of the composite article preferably form an integral monolithic entity, capable of functioning as a cemented doublet or higher-order composite lens structure. The composite article exhibits dimensional stability, high-fidelity replication of an internal mold cavity, and high impact resistance.

In one embodiment, the article of the invention is an ophthalmic lens. In a presently preferred embodiment, the final lens is a multi-vision lens and further may incorporate astigmatic corrections.

In another embodiment, the article of the invention is an electronic display device comprising a cured resin superstrate covering and permanently bonded to the active surface of the device (substrate). The surface of the cured resin is molded into a desired geometry to control the reception or emission of light to or from the device. A presently preferred embodiment is an optical array covering one or more microchips containing a light-capturing, light-emitting, or light-altering electronic device.

DETAILED DESCRIPTION OF THE INVENTION

The terms "a" and "an" as used herein and in the appended claims mean "one or more".

The term "(meth)acrylate" as used herein and in the appended claims encompasses both acrylate and methacrylate.

A primary advantage of this invention is to combine one or more desirable properties of the substrate material (impact resistance in the case of polycarbonate, for example) with the benefits to be realized by molding a semi-solid material. Additional advantages are discussed in more detail below.

The composite optical articles of the present invention comprise a substrate and at least one layer or superstrate of a cured resin permanently bonded to the substrate, the cured resin being a polymer blend of a polymerized reactive plasticizer and a dead polymer or a polymerized reactive plasticizer alone.

The optical lens substrate composition of the present invention may be selected to provide high impact-resistance or any other desirable property to the resulting composite lens. In accordance with an embodiment of the present invention, preferred polymers for use as optical lens substrates are aromatic halogenated or non-halogenated polycarbonate polymers. More preferred polymers are bisphenol A polycarbonate, ortho-methoxy bisphenol A polycarbonate, α,α'-dichloro bisphenol A polycarbonate, and poly(diphenyl methane bis(4-phenyl)carbonate), with the most preferred material for use in connection with the present invention being bisphenol A polycarbonate. Bisphenol A polycarbonate is commercially available in the form of finished or semi-finished single vision lens preforms from many commercial manufacturers, examples being BMC Industries, Inc., Hoya Lens of America, Essilor of America, Inc., and Sola Optical, Inc. Bisphenol A polycarbonate has a high impact resistance, a refractive index of about 1.58 and an Abbe number of about 28–30.

Other substrate materials may be useful for the present invention as well. For example, optical quality or photochromic glasses, bisallyl carbonates, polyethylene terephthalates, polybutylene terephthalates, polystyrenes, polymethyl methacrylates, acrylonitrile-butadiene-styrene copolymers, polystyrene-co-butadiene copolymers, polystyrene-co-isoprene copolymers, polycyclohexylethylene, polycyclohexylethylene-co-butadiene copolymers, amorphous polyolefins and copolyolefins, polyurethanes, or variations thereof, and others, may be advantageously used as one or more substrate materials in the present invention (many optical quality glasses and plastics are known in the current art).

The substrates useful in the practice of the present invention may be simple piano lenses (i.e., no correction) consisting of two spherical or aspherical surfaces. Alternatively, one surface may be spherical or aspherical, while the other surface may possess either the toroidal shape for astigmatic correction or a corrective prescription section for multi-vision correction. By "multi-vision" and "multi-focal" is meant herein that there is a bifocal, a tri-focal, or a progressive focal region present on one or more of the lens surfaces. Such substrates are readily available commercially when the front surface is multi-focal and the back surface is spherical, or when the back surface is toroidal and the front surface is spherical, because the number of different variations for either the front or the back surfaces alone is small. In the case of plastic substrates, these may be easily manufactured by standard injection molding or thermoforming techniques well known in the art. The substrates may alternatively have different radii of curvature comprising their front and back surfaces (i.e., non-piano surfaces). Such may be the case when, in the present invention, the primary optical correction is to be built into the substrate instead of into the cured resin layer.

The term "front surface" as used herein and in the appended claims is meant the surface of an ophthalmic lens that is furthest away from the wearer. The front surface is usually convex or flat, and also typically possesses the multi-vision corrective pocket or zone. The term "back surface" as used herein and in the appended claims is meant the surface of an ophthalmic lens that is closest to the wearer. The back surface is usually concave or flat, and also typically possesses the toroidal curve used for astigmatic correction.

When polarized lenses are desired, a polarizing film may serve as the substrate during the practice of this invention. Because most commercially available polarized films are relatively soft materials unable to provide scratch-resistant properties, it is preferable to form superstrates on both sides of the polarizing film substrate. Such processes may occur sequentially, forming first the front superstrate and then the back superstrate (or vice-versa), or the two superstrates may be formed at the same time by placing semi-solid material on both sides of the film and compressing the semi-solid material using front and back mold halves concurrently prior to cure.

Thus, in the general practice of this invention the semi-solid polymerizable superstrate material may be added to both the front and the back surfaces of the substrate, to just the front surface of a substrate already possessing a desired back curve, or to just the back surface of a substrate already possessing a desired front curve. Alternatively, the semi-solid may be added in between two substrates, one having the desired front surface geometry and the other having the desired back surface geometry. The resulting semi-solid/substrate sandwich is then compressed between two mold halves. In one embodiment of this invention, the semi-solid material is a preform having a convex curvature greater than any concave surface of the mold/substrate, while having a lesser or more flat curvature than the mold or substrate for any convex surface of the mold/substrate. Subsequently, the preform may be placed in the center of the substrate or mold so that when the mold(s) and/or substrate(s) are compressed together, the semi-solid makes contact with the mold/substrate near the center and flows radially outward towards the substrate or mold edges. Such a configuration allows the semi-solid material to fill in the gap between the substrate and mold without entraining or trapping bubbles, air pockets, or other void defects between the semi-solid and the substrate(s), between the semi-solid and the mold(s), or within the semi-solid itself.

In another preferred embodiment of this invention, the semi-solid polymerizable material is a preform having the shape of a flat or nearly flat disc or plate. The disc or plate may then be sandwiched between the desired configuration of molds and substrates. When temperature and pressure conditions are fixed appropriately, the flat semi-solid preform may be pressed into a curved mold or substrate without entraining or trapping bubbles, air pockets, or other void defects. This result is surprising in that one might expect that air pockets or other void defects would be captured between the semi-solid and mold or substrate surfaces. However, the inventors have observed that when the semi-solid is not excessively heated (such that it begins to flow freely), air pockets appear to be squeezed out and eliminated from between the approaching semi-solid and mold/substrate surfaces. This observation is important because it may prove easier or more economical to produce flat semi-solid preforms, such as by cutting from a nominally flat sheet. Even production of preform shapes that have at least one axis with an infinite radius of curvature (such as a cylinder, for example) should be more economical than production of preforms with spherically curved surfaces. The latter type of preforms usually require a technique such as injection molding, while the former type of preforms may be created by first extruding a sheet having the desired two dimensional profile, then cutting the desired shape from the sheets.

When the semi-solid material is only molded on one side of the substrate, the substrate may be supported sufficiently to hold the substrate without undesired levels of deformation while the semi-solid is compressed into the desired geometry. One facile method for supporting the substrate is to use a mold blank approximately matching the curvature or shape of the substrate. When two substrates are sandwiched with the semi-solid in between, the substrates should again have sufficient support to prevent deformation of the substrates. This may be accomplished by using molds with the approximate curvature of the substrates. In either case, optical quality surfaces on the molds are no longer required.

When fabricating multi-vision ophthalmic lenses with astigmatic correction, rotating the mold or substrate possessing the toroidal surface relative to the other mold or substrate possessing the multi-vision surface yields the desired rotational configuration of the toroidal surface relative to any multi-vision region in the lens. Thus, the rotational angle of the toroidal surface with respect to the add pocket is "dialed in" during the final molding process. This greatly reduces the inventory of molds or substrates that must be stocked to produce a given range of prescriptions. And since the molds are only used to shape the semi-solid material in a comparatively low-temperature and/or low-pressure molding process, the molds are much simpler and less expensive than those required for injection molding operations.

Once the semi-solid/substrate sandwich has been pressed into the desired shape, the system is exposed to a source of polymerizing energy (such as UV light and/or temperature; x-rays; e-beam; gamma radiation; microwave radiation; or ionic initiation) to cure the semi-solid material, which forms a cured and hardened resin superstrate portion that is bonded to the substrate. Upon cure, the molds are separated, yielding a composite sandwich of one or more previously semi-solid layers combined with a substrate. When polycarbonate substrates are used, the resulting composite lens has exceptional impact resistance, but is also easily fabricated with both toroidal curves and multi-focal pockets as a result of the semi-solid molding process. Such lenses may be economically produced by "just-in-time" manufacturing techniques, thus eliminating the need to inventory a large number of lenses to cover the available prescription ranges and design style features.

Presently preferred embodiments of the processing scheme described above include the production of multi-vision composite lenses comprising a superstrate front surface bonded to a substrate back surface. Said substrates may consist of commercially available toroidal single vision lenses or lens blanks made from CR-39, polycarbonate, or another of the many ophthalmic lens materials.

A variation of this production scheme comprises a substrate or superstrate material that contains a photochromic dye. A preferred embodiment uses a semi-solid superstrate-forming material containing a photochromic dye to form a relatively thin photochromic layer (typically about 0.3 mm to about 2 mm , preferably 0.5 mm to 1.5 mm ) on the convex surface of a lens blank substrate to give a desired composite lens structure. The benefit of this configuration is that the lens blank may be surfaced (altering the back surface of the blank to form a finished lens by grinding and polishing to achieve the desired prescription) with little or no loss of expensive photochromic dye-containing material. A further benefit of this configuration is that the photochromic dye can be dispersed throughout the superstrate layer, thus giving a desirable photochromic layer thickness of 0.3 mm to about 2 mm .

A photochromic dye can be selected from the general classes of spiroxazines, spiropyrans, and chromenes. Many photochromic dyes of these types, and others, are known in the literature and are available commercially. One skilled in the art will be able to select the photochromic dye(s) suitable to the desired dead polymer/reactive plasticizer system without undue experimentation.

In yet another preferred embodiment of the present invention, polarized lenses having thin profiles are produced by forming superstrates on both sides of a polarizing film substrate. In this processing scheme, a polarizing film is chosen which has approximately the same curvature as the front surface of the desired composite lens. A mold having the desired geometry for either the front or back surface (spherical, aspherical, multi-focal, toroidal, etc.) is then chosen, along with a support having approximately the same curvature as the polarizing film. The semi-solid material (in a preform state if desired) is then placed on either side of the polarizing film, with the support placed on the opposite side. The appropriate mold is then used to compress the semi-solid into the desired superstrate geometry between the supported polarizing film and the mold, after which the support is removed. A second semi-solid is then placed on the other side of the polarizing film (keeping the opposite mold and semi-solid superstrate in place), and a second mold is then used to create a second superstrate on the side of the polarizing film opposite the first superstrate. If desired, the first semi-solid superstrate can be cured or partially cured prior to forming the second superstrate, or the two semi-solids can be cured at the same time.

The resulting composite lens possesses an embedded polarizing film between two previously semi-solid superstrates. Preferably the superstrate comprising the front part of the lens is approximately 0.5 to about 1 mm thick, while the back superstrate is equally thin in the center if the lens is not to be surfaced further, yielding a composite lens that is about 1 to 2 mm thick. In the case where the lens is to be surfaced to give an alternate back surface, then the sacrificial superstrate (usually the back) may be as thick as about 15 mm.

The presently disclosed invention may further be directed towards the production of "cemented doublet" optical lenses by bringing a semi-solid material into contact with a first optical component and then using a mold having a desired geometry and desired optical quality surface to deform the semi-solid such that it is shaped into the geometry of a second optical lens by grinding and polishing to achieve the desired prescription) with little or no loss of expensive photochromic dye-containing material. A further benefit of this configuration is that the photochromic dye can be dispersed throughout the superstrate layer, thus giving a desirable photochromic layer thickness of 0.3 mm to about 2 mm.

A semi-solid polymerizable material may be blended and mixed with a photochromic dye; or the dye can be introduced into the semi-solid through monomers. Blending and mixing may be conducted by an internal mixer, a twin extruder, or the like. In general, photochromic dyes have limited solubility in polymers; therefore, uniform distribution may be difficult to achieve. Such a problem can be overcome by first dissolving the photochromic dye into a proper monomer. The resulting reactive photochromic solution is then introduced into the polymer through either salvation or mixing. Such a polymer, monomer and dye composition should be chosen to preserve the photochromic property after the cure reaction and achieve optimal photochromic performance. A photochromic dye can be selected from the general classes of spiroxazines, spiropyrans, and chromenes. Many photochromic dyes of these types, and others, are known in the literature and are available commercially. One skilled in the art will be able to select the photochromic dye(s) suitable to the desired dead polymer/reactive plasticizer system without undue experimentation.

In yet another preferred embodiment of the present invention, polarized lenses having thin profiles are produced by forming superstrates on both sides of a polarizing film substrate. In this processing scheme, a polarizing film is chosen which has approximately the same curvature as the front surface of the desired composite lens. A mold having the desired geometry for either the front or back surface (spherical, aspherical, multi-focal, toroidal, etc.) is then chosen, along with a support having approximately the same curvature as the polarizing film. The semi-solid material (in a preform state if desired) is then placed on either side of the polarizing film, with the support placed on the opposite side. The appropriate mold is then used to compress the semi-solid into the desired superstrate geometry between the supported polarizing film and the mold, after which the support is removed. A second semi-solid is then placed on the other side of the polarizing film (keeping the opposite mold and semi-solid superstrate in place), and a second mold is then used to create a second superstrate on the side of the polarizing film opposite the first superstrate. If desired, the first semi-solid superstrate can be cured or partially cured prior to forming the second superstrate, or the two semi-solids can be cured at the same time.

The resulting composite lens possesses an embedded polarizing film between two previously semi-solid superstrates. Preferably the superstrate comprising the front part of the lens is approximately 0.5 to about 1 mm thick, while the back superstrate is equally thin in the center if the lens is not to be surfaced further, yielding a composite lens that is about 1 to 2 mm thick. In the case where the lens is to be surfaced to give an alternate back surface, then the sacrificial superstrate (usually the back) may be as thick as about 15 mm.

The presently disclosed invention may further be directed towards the production of "cemented doublet" optical lenses by bringing a semi-solid material into contact with a first optical component and then using a mold having a desired geometry and desired optical quality surface to deform the semi-solid such that it is shaped into the geometry of a second optical component in contact with the first optical component. Upon cure and mold removal, the resultant product is the equivalent of a cemented doublet optical system in that two optical lens components are fabricated in contact and effectively bonded to each other. This technique combines the formation process of the second optical component with the bonding process to the first optical component, eliminating the need for an optical adhesive and a separate bonding step. A further benefit is that the surface of the semi-solid will be molded on one side by the first optical component, thus insuring complete matching between the two surface geometries.

In a variation of the process of the invention, a first or front substrate lens having a multi-vision pocket molded into the front surface (the back surface may be simply spherical, for example) and a second or back substrate lens having a toroidal back surface and a front surface having nominally the same curvature as the back surface of the front lens are obtained. Next, a semi-solid polymerizable material is placed between the two substrate lenses, which are then compressed together so that the semi-solid material fills in the gap and forms a layer between the two lenses. In one embodiment of this invention, the semi-solid may be placed in about the center of the two substrates so that when the substrates are compressed, the semi-solid will flow radially outward towards the substrate edges. Such a configuration allows the semi-solid to fill in the gap between the substrates while reducing or eliminating the entrainment of bubbles, air pockets, or other void defects between the semi-solid and the substrate(s), between the semi-solid and the mold(s), or within the semi-solid itself. Finally, the entire sandwich is exposed to a source of polymerizing energy to cure the semi-solid material, effectively bonding the two substrate lenses together, and to also harden the semi-solid material. The semi-solid material chosen to form the layer between two such substrate lens layers may be formulated to be tough, rubbery and/or flexible such that it forms an impact-resistant layer between the two lenses. When polycarbonate is used as the substrate lenses, such a configuration improves upon the already excellent impact resistance of polycarbonate by providing a cushion or impact-absorbing layer between the front and back polycarbonate substrates.

The semi-solid layer may also be formulated to contain liquid crystalline polymers such that a polarizing film is formed and trapped in the semi-solid material (optionally between two substrate lenses). Alternatively, semiconducting materials, such as for example semiconducting films or semiconductor chips (e.g., LED's), may be embedded into the semi-solid layer by placing such a film or chip between the semi-solid and the substrate(s) prior to applying and compressing the semi-solid material. The semiconducting materials may also be placed within the semi-solid material so that the semi-solid material completely encapsulates the semiconducting material prior to applying and compressing the semi-solid material. In either case, the resulting composite lens has light-emitting, light-capturing, or light-altering electronics embedded and encapsulated within. Such a system may further benefit from the semi-solid formulations contemplated in this specification by virtue of the low shrinkage associated with curing these materials that give rise to inherently lower shrinkage than curable liquid formulation analogs.

In yet another variation of the fabrication method of the invention, the semi-solid polymerizable material may be applied to one or more surfaces of an LED, LCD, or other electronic display device. The semi-solid composition may then be compressed, squeezed, or otherwise shaped by a mold coming into contact with the semi-solid material. In one embodiment, the semi-solid is squeezed by the mold such that it flows over and covers the active surface of the display device. The device/semi-solid/mold sandwich is then exposed to a source of polymerizing energy to cure and harden the semi-solid material, after which the mold is removed. The resulting interface between the cured resin and the surrounding ambient has a particular desired geometry to give a surface that directs, focuses, or defocuses incoming or outgoing light. The resultant article is an encapsulated electronic display device in which the encapsulant has molded-in optics on the surface for controlling the reception or emission of light to/from the device. As compared to the use of dead polymers alone, such as conventional thermoplastics, the semi-solid materials of this invention may be molded to the surface of the electronic device at lower temperatures and/or lower pressures, leading to less stress imparted to the electronic device itself. Such low-stress considerations are especially important as the sizes of the electronic device to be altered continue to increase.

The superstrate(s) of the devices of the present invention is formed from a semi-solid polymerizable material. The terms "semi-solid" and "semi-solid-like" as used herein and in the appended claims mean that, in essence, the polymerizable composition is a rubbery, taffy-like mass at sub-ambient, ambient, or elevated temperatures. Preferably the semi-solid mass has a sufficiently high viscosity to prevent dripping at ambient temperatures and pressures or below, but is malleable and can easily deform and conform to mold surfaces if the mold cavity is slightly heated or as a result of pressure exerted by pressing the two mold halves together, or a combination of both heat and pressure. In a presently preferred embodiment, the viscosity will be greater than about 25,000 centipoise and preferably greater than 50,000 centipoise at the temperature at which the material is to be handled (e.g., inserted into a mold cavity). Such compositions may be handled, stored, and easily inserted into the mold assembly as a non-free-flowing material, yet are easily deformed and shaped into the desired geometry with lower temperatures and/or less pressure than that required to perform the same operation on a fully polymerized, unplasticized dead polymer.

An advantage of this semi-solid composition is that it can be pre-formed into a slab, disk, ball, or sheet, for example, which may in turn be pressed between mold halves to define a lens or other object without an intervening gasket. Alternatively, a glob of this semi-solid composition can be applied at slightly elevated temperature on one side of a mold cavity. The substrate(s) and/or one or both mold halves are then brought into contact with the semi-solidified mass, which is squeezed into the final desired shape by the approaching mold halves or substrates. Again, there is no need for gasketing of the assembly, as the composition will not run out of the mold due to its viscous semi-solid-like nature (except that which is squeezed out in clamping the mold shut). Furthermore, the shaped mass may be kept at a slightly elevated temperature after mold closure (without loss of the material out of the mold) to anneal away the stresses (birefringence), if any, introduced by squeezing, before the system is exposed to a source of polymerizing energy (such as UV light or temperature) to trigger network formation (curing).

The semi-solid polymerizable materials useful in the present invention comprise a mixture of a reactive plasticizer, a polymerization initiator and, optionally, a dead polymer. The compositions may optionally include other additives well-known in the art, such as mold release agents to facilitate removal of the object from the mold after curing, non-reactive conventional plasticizers or flexibilizers, pigments, dyes, tinting agents, organic or inorganic fibrous or particulate reinforcing or extending fillers, thixotropic agents, indicators, inhibitors or stabilizers (weathering or non-yellowing agents), UV absorbers, surfactants, flow aids, chain transfer agents, anti-reflective agents, scratch-resistant additives, and the like. For the practice of the invention as disclosed herein, it is only required that the composition (1) be highly viscous, semi-solid or solid-like for handling and/or insertion into a mold assembly at some temperature (i.e., non-free-flowing over the time periods required for mold filling), while being semi-solid or liquid-like (i.e., deformable) at the processing temperature to which the mold assembly is heated or cooled after closure; (2) exhibit a lower viscosity than the corresponding dead polymer(s) in the absence of the reactive plasticizer; and (3) be reactive such that a higher viscosity material results upon curing. Since most known material systems become more compliant upon heating, the molding temperature will usually, but not necessarily, be equal to or higher than the handling temperature, unless high temperatures are used to facilitate injection into the mold, in which case the mold temperature may desirably be cooler than the material temperature just prior to insertion into the mold.

In principle, any reactive plasticizer system (with or without dead polymer) which can be handled as a semi-solid or solid at some temperature, and which can be made to conform to a desired geometry (with or without changing the temperature and/or using force), can be used for the practice of the invention.

The semi-solid materials are prepared, in one embodiment, by mixing a dead polymer with at least one small-molecule species, which is itself polymerizable or crosslinkable. This small-molecule species is referred to herein as a "reactive plasticizer". In another embodiment, the semi-solid polymerizable material comprises a reactive plasticizer or a mixture of reactive plasticizers, without the presence of a dead polymer. The reactive plasticizer may encompass monomers, crosslinkers, oligomeric reactants, oligomeric crosslinkers, or macromeric reactants or macromeric crosslinkers (collectively macromers). It may be preferable to formulate the reactive semi-solid compositions of the present invention using only reactive plasticizers that are low molecular weight polymers or oligomers that still possess reactive groups capable of later polymerization. In this case, the reactive plasticizer should be a longer chain molecule, of from about 1 to about 1000 repeat units, and preferably between about 1 and about 100 repeat units. These reactive plasticizers (or mixture of reactive plasticizers) have a high viscosity, preferably of greater than 1000 centipoise, at the temperature at which the material is to be handled (e.g., inserted into a mold cavity) to exhibit semi-solid behavior. Such a composition still falls within the scope of this invention because in this case a lower molecular weight distribution is used to achieve the desired viscosity reduction versus plasticization of a dead polymer with a reactive plasticizer. The reactive plasticizers can be mixtures themselves, composed of mono-functional, bifunctional, tri-functional or other homogeneous or heterogeneous multi-functional entities (heterogeneous reactive plasticizers being those that possess two or more different types of reactive functionalities).

The term "dead polymer" as used herein and in the appended claims refers to a substantially fully polymerized, generally non-reactive polymer. The term "substantially fully polymerized", as used herein and in the appended claims, refers to a polymer that is at least 95% polymerized and is preferably at least 98% polymerized. When certain polymer chemistries are used, the dead polymer may react with a reactive plasticizer, even if the dead polymer does not have unsaturated entities within or attached to the chain. The dead polymer may be linear or branched, homopolymer or copolymer. In the case of a copolymer, the sequence distribution may be random in sequence or blocky. The block copolymers may be tapered, or may have grafted side chains. The architecture of the dead polymer may be branched, multi-chain, comb-shaped or star-shaped. Di-block, tri-block or multi-block structures all fall within the scope of this invention.

Thus, the semi-solid compositions of the present invention comprise one or more reactive plasticizers and a substantially fully polymerized, solid, conventional polymer (i.e., the dead polymer). This approach greatly broadens the utility of the present invention because many different dead polymers may be incorporated into the semi-solid compositions, including dead polymers that do not pass through an intermediate, transitional semi-solid state in the course of normal manufacture. The reactive plasticizer plays a unique role in the present invention in that it simultaneously: (1) plasticizes the dead polymer to give a composition having one desired consistency at ambient temperature or below (i.e., able to maintain a shape for easy handling over short time periods) and another desired consistency at the processing temperature (i.e., malleable enough to be compressed or formed into a desired shape); and (2) adds or restores a polymerizable feature or character to the dead polymer.

One benefit of this scheme is that the semi-solid material, which is a plasticized version of the dead polymer(s) in one embodiment, may be flowed and/or molded at temperatures lower than would otherwise be possible for the dead polymer alone. Since the curing of the reactive plasticizer typically eliminates this plasticizing effect, there is an effective hardening of the material upon curing. In conventional processing, one must rely on temperature reduction for hardening of the molded polymeric parts before ejection from the mold cavity. Thus, a beneficial result of this approach over the molding and/or thermoforming of pure polymers not containing reactive plasticizers is that the demolding process can occur more quickly with the semi-solid materials of the present invention because curing can be used to harden the material in the mold. Additionally, for processes that use a die or other device to shape a polymeric material as it is ejected from an orifice, the semi-solid materials of this invention may be beneficially hardened or solidified by inducing the curing reaction at or near the point of die exit. Curing of the reactive plasticizer effectively increases the "melt" strength at the die exit temperature by reducing or eliminating the plasticizing effect when desired. The transition will be especially pronounced when multifunctional plasticizers are used, or when significant crosslinking during cure.

The processing temperature used to shape the semi-solid materials into the desired geometry can be chosen conveniently to be moderately above or below ambient temperature. An advantage of the present invention is that this processing temperature may be below that used in identical processing operations utilizing conventional dead polymers only. When the semi-solid material is cured, the reactive plasticizers set up a semi-interpenetrating polymer network within an entangled dead polymer network. In some cases, the reactive plasticizer may react with groups on the dead polymer chain to form completely crosslinked networks.

The types and relative amounts of reactive plasticizer and dead polymer, the resulting semi-solid material, and methods of making the semi-solid material are disclosed and discussed in PCT Publication No. WO/17675, the entire disclosure of which is incorporated by reference herein.

In total, the amount and composition of the reactive plasticizer in the resulting formulation are such that the formulation is semi-solid-like and can be effectively handled with no need for a gasket in the mold. That is, the reactive plasticizer is present in concentrations sufficient to allow malleability and moldability at the desired processing temperature and pressure; however, the mixture is not free-flowing at the material storage temperature, which can be conveniently chosen to be at ambient temperatures, or slightly above or below. The amount of reactive plasticizer is generally from about 0.1% to about 100% by weight, preferably from about 1% to about 50%, more preferably from about 15% to about 40%.

The types and relative amounts of reactive plasticizer and dead polymer will dictate the time and temperature-dependent visco-elastic properties of the mixture. The visco-elastic properties of the chosen compositions may be wide and varied. The uniquely formulated materials of this invention may exist as a solid at room temperature (i.e., the glass transition temperature of the mixture may still be above room temperature, but necessarily shall be below the glass transition temperature of the pure-component dead polymer or corresponding polymer mixture or blend). Such systems require an elevated temperature to acquire the semi-solid state, much as thermoplastics are heated to induce flow and facile molding operations, but shall always be discernible by plasticization effects of the reactive plasticizers. The concept of plasticization and the various physical effects that result in polymeric systems is described in various polymer texts. Two main plasticization effects are lower $T_g$ and lower modulus (and/or viscosity) at a given temperature upon the addition of the reactive plasticizer. There are many other measurable effects as well, which are well known in the art. See, for example, Volume 48 of the Advances in Chemistry Symposia Series entitled *Plasticization and Plasticizer Processes*, 1965, American Chemical Society. Alternatively, the semi-solid compositions may be formulated to give materials that are above their glass transition temperature at ambient, thus implying that little or no heating would be required to mold the material into a desired geometry. For the practice of the invention as disclosed herein, it is only required that the composition be highly viscous, semi-solid or solid-like for handling and/or insertion into a mold assembly at some temperature, while being semi-solid or liquid-like (i.e., deformable) at the processing temperature to which the mold assembly is heated or cooled after closure, with the additional requirement that the effects of the reactive plasticizer be discernible compared to the pure component dead polymer.

If the mixture consists mostly or wholly of reactive plasticizers, it may need to be cooled or partially cured in order to achieve the semi-solid-like consistency desirable for handling. Likewise, the mold-assembly temperature (the temperature at which the semi-solid composition is inserted into the mold) may desirably be below ambient temperature or below the material handling or injection temperature to prevent dripping or leaking from the mold prior to closure. Once the mold is closed, however, it may be compressed and heated to any pressure and temperature desired to induce conformation of the material to the internal mold cavity, even if such temperatures and pressures effect a free-flowing composition within the mold cavity (i.e., a composition which becomes free-flowing at the molding temperature is not precluded, and may be desirably chosen for the molding of fine-featured parts in which the molding compound must fill in small cavities, channels, and the like).

The composition most desirable for the practice of the invention will typically consist of about 15% to about 40% of a reactive plasticizer in a dead polymer. Once combined, said preferable mixture should provide a composition that is semi-solid at slightly above room temperature, such that it may be easily handled as a discrete part or object without undue stickiness or deformability under ambient conditions. The mixture may be more easily homogenized at an elevated temperature and discharged into discrete parts or preforms, which roughly approximate the desired shape of the final object, then cooled for handling or storage. When said preferable mixture or parts are placed into a mold and heated slightly above ambient temperature, or otherwise shaped or compressed while simultaneously heated, they will deform into the desired geometry without undue resistance. Such a composition is preferable in that handling and storage may occur at room temperature, while molding or shaping into the desired geometry may occur at temperatures only slightly or moderately removed from ambient.

When used without a dead polymer or with only a small amount of dead polymer, the reactive plasticizer should be a reactive oligomer or a reactive short polymer, having at least one reactive functional group. In this case, the reactive plasticizer should be a longer chain molecule, of from about 1 to about 1000 repeat units, and preferably between about 1 and about 100 repeat units. In the case of low molecular weight reactive plasticizers, the mixture may first be slightly polymerized to create the semi-solid consistency required for downstream processing. Alternatively, the mixture may be cooled to create the semi-solid consistency.

Polymerization initiators are added to the mixture to trigger polymerization after molding. Such initiators are well-known in the art. Optionally, other additives may be added, such as mold release agents to facilitate removal of the object from the mold after curing, non-reactive conventional plasticizers or flexibilizers, pigments, dyes, tinting agents, organic or inorganic fibrous or particulate reinforcing or extending fillers, thixotropic agents, indicators, inhibitors or stabilizers (weathering or non-yellowing agents), UV absorbers, surfactants, flow aids, chain transfer agents, anti-reflective agents, scratch-resistant additives, and the like. The initiator and other optional additives may be dissolved in the reactive plasticizer component prior to combining with the dead polymer to facilitate complete dissolution into and uniform mixing with the dead polymer. Alternatively, the initiator and other optional additives may be added to the mixture just prior to polymerization, which may be preferred when thermal initiators are used.

The ingredients in the semi-solid polymerizing mixture can be blended by hand or by mechanical mixing. The ingredients can preferably be warmed slightly to soften the dead polymer component. Any suitable mixing device may be used to mechanically homogenize the mixture, such as blenders, kneaders, extruders, mills, in-line mixers, static mixers, and the like, optionally blended at temperatures above ambient temperature, or optionally blended at pressures above or below atmospheric pressure.

An optional waiting period may be allowed during which the ingredients are not mechanically agitated. The optional waiting period may take place between the time the ingredients are initially metered into a holding container and the time at which they are homogenized mechanically or manually. Alternatively, the ingredients may be metered into a mixing device, said mixing device operated for a sufficient period to dry-blend the ingredients, then an optional waiting period may ensue before further mixing takes place. The waiting period may extend for an hour to one or more days. The waiting period may be chosen empirically and without undue experimentation as the period that gives the most efficient overall mixing process in terms of energy consumption. This may be particularly beneficial when the polymerizable mixture contains a high fraction of the dead polymer ingredient, especially when the dead polymer is glassy or rigid at ambient temperatures. Utilization of a waiting period may also be particularly beneficial when the dead polymer is thermally sensitive and so cannot be processed over an extended time at temperatures above its softening point without undue degradation.

Preferred semi-solid compositions in connection with the present invention are those which are compatible with the substrate material(s) chosen to interface with the semi-solid. Such compatibility and processing conditions should be chosen such that no phase separation, crystallization, or clouding occurs at the interface between the semi-solid and the substrate material. Such factors will primarily be determined by the reactive plasticizers incorporated into the semi-solid, as opposed to the types and amounts of any dead polymer used.

Preferable superstrate compositions are ones in which the reactive plasticizers used in the semi-solid material are able to diffuse into the substrate material or are at least not incompatible with the substrate material. While not wishing to be bound by theory, it is believed that such behavior facilitates adhesion between the semi-solid and the substrate by forming a gradient material in which the chemical composition changes gradually upon moving across the interface from the semi-solid superstrate into the substrate material. Upon curing of the semi-solid/substrate sandwich, such gradient materials form an integral monolithic entity; that is, they exhibit integral substrate-semi-solid compositions with somewhat non-distinct interfaces, rather than the abrupt compositional changes seen at the interface of conventional coatings, for example.

When using polycarbonate substrates, it may be beneficial to use, as the reactive plasticizer, tetrahydrofurfural acrylate, benzyl (meth)acrylate, isobornyl (meth)acrylate, bisphenol A di(meth)acrylates (including their ethoxylated, propoxylated, and other similar versions), certain urethane acrylates, or other reactive species which may be found to exhibit a limited compatibility with polycarbonate. These above-mentioned reactive plasticizers show sufficient compatibility with polycarbonate to form strongly adhered layers when a semi-solid containing these reactive plasticizers is combined with a polycarbonate substrate. Selection of the semi-solid composition will depend on the substrate material to be used, as well as the desired final properties and configuration of the final composite lens or other article, but such selection may be achieved by those skilled in the art by known methods without undue experimentation.

Other preferable semi-solid compositions may be those that are formulated to possess a similar refractive index to the substrates used in accordance with this invention. Matching the refractive index between the semi-solid and substrate materials to within about 0.05 units of the refractive index will usually minimize any optical aberrations or other interface effects that might exist between the two materials. Alternatively, the semi-solid composition may be formulated to provide the highest or lowest refractive indices possible. High refractive index formulations may be used, for example, to maximize the optical corrective power for a given thickness of lens (where the thickness is determined by, among other things, the difference in radii of curvature between the front and back surfaces). Low refractive index formulations may be desirable, for example, to decrease the amount of light reflected from the front or back surface of a lens. A wide formulation latitude is made possible by the semi-solid compositions disclosed by this invention, and such latitude may be advantageously used to provide materials having a desired refractive index.

Another advantage of the semi-solid materials disclosed by this invention is that the semi-solid materials display low shrinkage upon cure. By "low shrinkage" is meant that the shrinkage of the composition of the invention upon cure will typically be less than about 8%, preferably less than about 5%. This benefit enables molding processes in which the fabricated part shows high replication fidelity of the mold cavity. In other words, because the polymerizable formulation shrinks very little upon cure (typically less than 8%, more preferably less than 5%), the cured part will maintain the shape of the mold cavity throughout cure and after demolding. Problems associated with shrinkage, such as warpage and premature mold release, which greatly hinder and complicate current state-of-the-art casting practices, are eliminated. In addition, the finished sandwich structure will have little residual stress. This high replication fidelity is particularly desirable in the formation of optical components that rely on precise, smooth surfaces, such as ophthalmic lenses.

The shrinkage issue is particularly important with respect to the fabrication of a sandwiched composite lens as disclosed herein because the shrinkage associated with conventional curing of pure monomers (e.g., bisallyl carbonates, acrylates, methacrylates, etc., which shrink by up to 15%) can lead to warpage of the substrate material being used, especially when the resin is only applied to one side of the substrate or when the substrate is relatively thin. The resultant article will often be bowed or warped in the direction of the cured resin. Also, such shrinkage causes a stress gradient at the interface of the cured resin and the substrate material. Such stress gradients, aside from producing the warpage mentioned, also lead to adhesion, delamination, and durability problems of composite lenses formed from liquid resins cured on the surface of the substrate. The semi-solid material of the present invention is distinctly different from monomeric coatings disclosed in the prior art in that the shrinkage is greatly reduced by the semi-solid compositions, thereby eliminating the warpage, adhesion, delamination, and durability problems encountered previously with pure monomeric resins.

The semi-solid material may be formulated to be rubbery, flexible, hard, impact-resistant, scratch-resistant, etc., as desired for the chosen substrate-superstrate configuration.

By coating or exposing the semi-solid pre-form to additional surface-forming or surface-modifying reactive plasticizers prior to polymerization, a gradient material may be formed, as disclosed in PCT International Publication No. WO 00/55653, the entire disclosure of which is incorporated herein by reference. In this manner, a rubbery or flexible "layer" or region may be incorporated specifically at the interface between the cured resin and the substrate material, for example. Such a gradient material may be used, for example, to accommodate and relieve any residual stress between the cured resin material and the substrate, yielding a composite lens with materials that are strongly bound to each other and not prone to delamination. Likewise, the semi-solid pre-form may be altered such that the final product is rendered hard or scratch-resistant near and at any outer surface by absorbing or otherwise applying or adding a surface-modifying composition containing a scratch-resistant material to such regions or areas of the pre-form where altered properties are desired. In another example, the surface composition may be a dye or pigment solution, which dye or pigment may be, for purposes of illustration, photochromic, fluorescent, UV-absorbing, or visible (color).

The semi-solid polymerizable material may be exposed to the surface-forming/modifying compositions by dipping the semi-solid into a bath of the surface material. Or, the surface materials may be vaporized on, painted on, sprayed on, spun on, printed on, or transferred onto the semi-solid preforms by processes known to those skilled in the art of coating and pattern creation/transfer. Alternatively, the surface-forming/modifying composition may be sprayed, painted, printed, patterned, flow-coated, or otherwise applied to one or more mold surfaces that are then contacted with the semi-solid material, with optional curing or partial curing of the surface-modifying material prior to the molding step. Certain of the surface-forming or surface-modifying compositions may absorb or flow into the loose sponge-like architecture of the uncured or partially cured semi-solid preform and are subsequently trapped within the resulting tight, polymerized network when the semi-solid composition is cured completely. In other instances, the surface-forming/modifying composition is itself polymerizable and forms an interpenetrating polymer network structure with the semi-solid preform when the two compositions are cured. In either case, the surface treatment is locked in, either chemically, physically, or both, giving a final product where the surface and the interior compositions of the cured resin layer are different and yet the surface and the interior are integral and monolithic.

Surface-forming materials for the purpose of scratch resistance enhancement can be selected from multifunctional crosslinkers that are compatible with the reactive plasticizers of the semi-solid polymerizable composition, so that they will react together to form the monolithic final product. By "compatible" in this sense is meant that the surface formulation may preferably inter-react with the reactive groups present in the semi-solid composition. Formulations used for imparting scratch resistance will often consist of one or more highly functional (i.e., functionality equal to or greater than 3) reactive species. Polymerization of such highly functional species in the near-surface region of the composite article will produce a tightly crosslinked, scratch-resistant outer layer that is monolithically integrated with the cured resin layer. Examples of such crosslinkers include, but are not limited to, triacrylates and tetraacrylates, and the ethoxylated or propoxylated versions of these multifunctional acrylates. Occluded nano-particles in the surface formulation can also impart exceptional scratch resistance. Those skilled in the art of nano-composites can readily adapt the present invention for use with the nano-composite literature.

Photochromic dyes useful as the surface-forming material are discussed in the following references: "Organic Photochromes", A. V. Elstsov, ed., Consultants Bureau Publishers, New York and London, 1990; "Physics and Chemistry of Photochromic Glasses", A. V. Dotsenko, L. B. Glebor, and V. A. Tsekhomsky, CRC Press, Baton Rouge and New York, 1998; "Photo-Reactive Materials for Ultrahigh Density Optical Memory", M. Irie, ed., Elsevier, Amsterdam and New York, 1994. The dyes may themselves possess reactive groups that chemically lock them into the near-surface region of the object, or the dyes may be entirely inert. In the latter case, the dyes will be held in the surface region of the object by the densely crosslinked network surrounding the dye molecules after polymerization. The process of the present invention allows the choice of dyes for tinting to be greatly expanded over that of the prior art methods. Dyes sensitive to thermal degradation may be utilized as the surface-forming composition, as may dyes that dissolve in organic media. Many commercially available dyes from sources such as Ciba Geigy, Aldrich, BASF, DuPont, etc., are soluble in organic media. Aqueous-phase soluble dyes are also possible candidates for this invention by using surface formulations that are polar or charged, or simply by dissolving the dyes in an inert, polar media (e.g., water, ethanol, ethylene glycol, acetone, etc.), which facilitates their uptake into the article prior to cure.

Low refractive-index monomers and crosslinkers may be used as the surface-forming composition to provide, for example, low reflectivity (for anti-glare applications, for example). Such compositions include vinyl or (meth) acrylated silicones, as well as perfluorinated or partially fluorinated acrylates and methacrylates and vinyl ethers, such as for example vinyl trifluoroacetate, trifluoroethyl acrylate, pentadecafluorooctyl acrylate, hexafluorobutyl methacrylate, perfluoroethyleneglycol diacrylate, and the like. These perfluorinated compounds may also enhance mold-release properties of the final product, as do silicone acrylates.

Anti-static monomers or inert additives may be used as the surface-forming composition to provide anti-static-charge surfaces in the composite lens. The anti-static surfaces minimize the collection of dust particles, increasing optical transmission and clarity and decreasing the need and frequency of cleanings. Reactive and inert anti-static additives are well known and well enumerated in the literature.

Heterofunctional additives may be used as the surface-forming composition for incorporation into the near-surface region of the semi-solid composite article. These heterfunctional additives may then serve as future reactive sites or as adhesion promoters for subsequent films or coatings. For example, mono-acrylated epoxies, hydroxyacrylates, aminovinyl ethers, or vinyl anhydrides may be chemically incorporated into the surface region(s) of the composite article by reaction of the vinyl groups. The epoxy, hydroxy, amino, or anhydride groups may then be used to capture, react with, and/or promote adhesion of subsequent films or coatings using chemical reactions other than the vinyl-based polymerization.

EXAMPLES

Two example process schemes for preparation of the semi-solid compositions are discussed below. Numerous variants can be envisioned by those skilled in the art of polymerization reaction engineering and polymer processing and molding. Hence, the present invention is not limited by these two example processing embodiments.

Batchwise processing provides precision-casting from preforms. A dead polymer, a reactive plasticizer, and an initiator package (optionally including other additives such as anti-oxidants, stabilizers, and the like) are mixed together (optionally with a waiting period during which the ingredients are not mechanically agitated) in a mixer equipped with temperature control and vacuum capabilities, to form a semi-solid polymerizable composition free of voids or air bubbles. The semi-solid composition is discharged from the mixer, and the discharge is cast into slabs (disks, pucks, balls, buttons, sheets, and the like), which serve as pre-forms for the subsequent preparation of the composite articles of the present invention. Alternatively, an extruded strand of the semi-solid composition can be sliced or diced into pre-forms. In a downstream operation, the pre-forms (which may be stored at room temperature or refrigerated temperatures in the interim, or which may even be partially cured to facilitate handling and storage) are retrieved, placed together with at least one substrate into a mold, shaped, and cured via exposure to a source of polymerizing energy, into the desired geometry to produce the final composite optical lens article. In a presently preferred embodiment, the preforms are sandwiched between mold halves, whereupon the mold is closed, briefly heated to enhance material compliance as necessary, and flood-exposed by UV or heat-cured.

In an alternative, continuous process, the dead polymer, the reactive plasticizer, and the initiator package (optionally including other additives such as anti-oxidants, stabilizers, and the like) are mixed together in an extruder. There is optionally a waiting period prior to the material being introduced into the extruder, during which time the ingredients are in intimate contact with one another, but are not mechanically agitated. Periodically, the extruder discharges a fixed amount of semi-solid reactive plasticizer-dead polymer composition as a warm glob into a temperature-controlled mold cavity containing a substrate. The mold, which exhibits a telescopic fit of the front/back mold assembly, is then closed. An optional waiting period may ensue at the still-elevated temperature to anneal any stresses induced by squeezing of the glob. Finally, the captured material is exposed to a source of polymerizing energy.

Material Design Considerations

The semi-solid polymerizable compositions comprise the combination of dead polymers with monomeric or oligomeric reactive diluents. These reactive diluents, when used in small amounts, actually serve the role of plasticizers. Instead of inert plasticizers that simply remain in a plastic to soften the material, the reactive diluents/plasticizers can initially soften the polymer to facilitate the molding process (allowing for lower temperature molding processes compared with the processing of conventional, unplasticized thermoplastic materials); but, upon curing, the polymerized reactive plasticizers lock in the precise shape and morphology of the polymer (and also lock in the reactive plasticizers themselves so that they cannot leak or be leached out of the material over time).

Once polymerized, the reacted plasticizers no longer soften the dead polymer to the same extent as before curing. The hardness of the cured part will be determined by the chemical structure and functionality of the reactive plasticizers and the dead polymers used, their concentration, molecular weight, and the degree of crosslinking and grafting to the dead polymer chains. Additionally, chain-terminating agents can be added to the formulation prior to polymerization in order to limit the molecular weight and degree of crosslinking of the polymer formed by reacting the plasticizers, thus adding a measure of control in altering the final mechanical properties of the cured parts. At the same time polymerization results in no significant shrinkage (due to the overall low concentration of the reactive plasticizer or the low population of reactive entities), so the finished objects remain dimensionally stable, yielding high fidelity replication of the mold cavity. Precise geometric replication of the mold cavity is further preserved due to the relatively low molding temperatures and reduced exotherm from polymerization.

Subsequent discussions concerning the basic material design considerations are divided into two categories based on the type of dead polymer utilized in the process. One category begins with standard thermoplastics as the dead polymer. These include, but are not limited to, polystyrene, polymethylmethacrylate, poly(acrylonitrile-butadiene-styrene), polyvinyl chloride, polycarbonate, polysulfone, polyvinylpyrrolidone, polycaprolactone, and polyetherimide, for example. The thermoplastics may optionally have small amounts of reactive entities attached (copolymerized, grafted, or otherwise incorporated) to the polymer backbone to promote crosslinking upon cure. They may be amorphous or crystalline. They may be classified as engineering thermoplastics, or they may be biodegradable. These examples are not meant to limit the scope of compositions possible during the practice of the current invention, but merely to illustrate the broad selection of thermoplastic chemistries permitted under the present disclosure. Reactive plasticizers may be mixed with a thermoplastic polymer such as those listed above to give a semi-solid-like composition that can be easily molded into dimensionally precise objects. Upon curing, the dimensional stability of the object is locked in to give exact three-dimensional shapes or precise surface features. Thermoplastic polymers may be chosen in order to give optical clarity, high index of refraction, low birefringence, exceptional impact resistance, good thermal stability, high oxygen permeability, UV transparency or blocking, low cost, or a combination of these properties in the finished, molded object.

The other category utilizes "thermoplastic elastomers" as the dead polymer. An exemplary thermoplastic elastomer is a tri-block copolymer of the general structure "A-B-A", where A is a thermoplastic rigid polymer (i.e., having a glass transition temperature above ambient) and B is an elastomeric (rubbery) polymer (glass transition temperature below ambient). In the pure state, ABA forms a microphase-separated morphology. This morphology consists of rigid glassy polymer regions (A) connected and surrounded by rubbery chains (B), or occlusions of the rubbery phase (B) surrounded by a glassy (A) continuous phase, depending on the relative amounts of (A) and (B) in the polymer. Under certain compositional and processing conditions, the morphology is such that the relevant domain size is smaller than the wavelength of visible light. Hence, parts made of such ABA copolymers can be transparent or at worst translucent. Thermoplastic elastomers, without vulcanization, have rubber-like properties similar to those of conventional rubber vulcanizates, but flow as thermoplastics at temperatures above the glass transition point of the glassy polymer region. Melt behavior with respect to shear and elongation is similar to that of conventional thermoplastics. Commercially important thermoplastic elastomers are exemplified by SBS, SIS, SEBS, where S is polystyrene and B is polybutadiene, I is polyisoprene, and EB is ethylenebutylene copolymer. Many other di-block or tri-block candidates are known, such as poly(aromatic amide)-siloxane, polyimide-siloxane, and polyurethanes. SBS and hydrogenated SBS (i.e., SEBS) are well-known products from Shell Chemicals (Kraton®). DuPont's Lycra® is also a block copolymer.

When thermoplastic elastomers are chosen as the starting dead polymer for formulation, exceptionally impact-resistant parts may be manufactured by mixing with reactive plasticizers. The thermoplastic elastomers, by themselves, are not chemically crosslinked and require relatively high-temperature processing steps for molding which, upon cooling, leads to dimensionally unstable, shrunken or warped parts. The reactive plasticizers, if cured by themselves, may be chosen to form a relatively glassy, rigid network, or may be chosen to form a relatively soft, rubbery network, but with relatively high shrinkage. When thermoplastic elastomers and reactive plasticizers are blended together, they form flexible networks with superior shock-absorbing and impact-resistant properties. By "impact-resistant" is meant resistance to fracture or shattering upon being struck by an incident object. Depending on the nature of the dead polymer and reactive plasticizers used in the formulation, the final cured material may be more stiff or more stretchy than the starting dead polymer. Composite articles exhibiting exceptional toughness may be fabricated by using a thermoplastic elastomer which itself contains polymerizable groups along the polymer chain, such as SBS tri-block copolymers, for example.

Furthermore, when compatible systems are identified, transparent objects can be cast. "Compatibility" refers to the thermodynamic state where the dead polymer is solvated by the reactive plasticizers. Hence, molecular segments with structural similarity would promote mutual dissolution. Aromatic moieties on the polymer generally dissolve in aromatic plasticizers, and vice versa. Hydrophilicity and hydrophobicity are additional considerations in choosing the reactive plasticizers to mix with a given dead polymer. Even when only partial compatibility is observed at room temperature, the mixture often becomes uniform at a slightly increased temperature; i.e., many systems become clear at slightly elevated temperatures. Such temperatures may be slightly above ambient temperatures or may extend up to the vicinity of 100° C. In such cases, the reactive components can be quickly cured at the elevated temperature to "lock-in" the compatible morphology before system cool-down. Hence, both material and processing approaches can be exploited to produce optically clear parts.

Optically clear and dimensionally exact parts have a wide range of potential applications. For example, optically transparent materials such as polycarbonate, polystyrene, poly(meth)acrylates such as polymethyl methacrylate, polysulfone, polyphenylene oxide, polyethylene terephthalate, polyolefins, thermoplastic elastomers, and variations, copolymers, and/or mixtures of any of these materials can be employed to create useful formulations by mixing with suitable reactive plasticizer packages. Optically transparent phase-separated systems may be beneficial prepared by combining a phase-separated iso-refractive mixture as the dead polymers in the system. When a reactive plasticizer is added which either (1) partitions itself approximately equally between the phases or (2) has a refractive index upon polymerizing similar to that of the dead polymer mixture, a clear part results upon curing. Alternatively, when the reactive plasticizer does not partition itself equally between the phases and does not possess a refractive index upon curing similar to the polymer mixture, the refractive index of one of the phases may be altered to give a resultant iso-refractive mixture. With the process innovation described herewith, powerful new material systems can be developed.

A preferred formulation for developing optically clear and high impact-resistant materials uses cyclo-olefin polymers and/or cyclo-olefin copolymers (polyolefins) such as the cyclo-olefin Zeonor from Zeon Chemicals as a dead polymer. Formulations based on one or more of the Zeonor grades (1020R, 1060R, 1420R, 1600, etc.) exhibit excellent optical properties, impact resistance, thermal stability, good hardness, low water absorption, and low density (approximately 1.01 g /cc for the pure polymer).

Another preferred formulation for developing optically clear and high impact-resistant materials uses styrene-rich SBS tri-block copolymers that contain up to about 75% styrene. These SBS copolymers are commercially available from Shell Chemicals (Kraton®), Phillips Chemical Co. (K-Resin®), BASF (Styrolux®), Fina Chemicals (Finaclear®), and Asahi Chemical (Asaflex®). In addition to high impact resistance and good optical clarity, such styrene-rich copolymers yield materials systems which preferably exhibit other desirable properties such as high refractive index (that is, the index of refraction is greater than 1.499) and low density. When the mixture refractive index is an especially important consideration, high refractive index polymers may be used as one or more of the dead-polymer components. Examples of such polymers include polycarbonates and halogenated polycarbonates; polystyrenes and halogenated polystyrenes; polystyrene-polybutadiene block copolymers and their hydrogenated and halogenated versions (all of which may be linear, branched, star-shaped, or non-symmetrically branched or star-shaped); polystyrene-polyisoprene block copolymers and their hydrodrogenated and halogenated versions (including the linear, branched, star-shaped, and non-symmetrical branched and star-shaped variations); poly(penta-bromophenyl (meth)acrylate); polyvinyl carbazole; polyvinyl naphthalene; polyvinyl biphenyl; polynaphthyl (meth)acrylate; polyvinyl thiophene; polysulfones; polyphenylene sulfides; urea-, phenol-, or naphthyl-formaldehyde resins; polyvinyl phenol; chlorinated or brominated polystyrenes; poly(phenyl α- or β-bromoacrylate); polyvinylidene chloride or bromide; and the like. In general, increasing the aromatic content, sulfur content, and/or halogen content (especially bromine) are effective means well-known in the art for increasing the refractive index of a material. These pro-perties are especially preferred for ophthalmic lenses as it enables the production of ultra thin, light-weight eyeglass lenses which are desirable for low-profile appearances and comfort of the wearer.

Alternatively, elastomers, thermosets (e.g., epoxies, melamines, acrylated epoxies, acrylated urethanes, etc., in their uncured state), and other non-thermoplastic polymeric compositions may be desirably utilized during the practice of this invention.

Mixtures of such materials may also be beneficially used to create dimensionally stable parts with desirable properties. For example, impact modifiers may be blended into various thermoplastics or thermoplastic elastomers to improve the impact strength of such material systems. In such cases, the presence of the reactive plasticizers will facilitate blending by lowering the softening temperature of the polymers to be blended. This is especially beneficial when a temperature-sensitive material is being blended with a high-$T_g$ polymer. When optically clear materials are desired, the mixture components may be chosen to have the same refractive index (iso-refractive) such that light scattering is reduced. When iso-refractive components are not available, the reactive plasticizers may also help reduce the domain size between two immiscible polymers to below the wavelength of light, thus producing an optically clear polymer mixture, which would have otherwise been opaque.

The reactive diluents (plasticizers) can be used singly or, alternatively, mixtures can be used to facilitate dissolution of a given dead polymer. The reactive functional group can be acrylate, methacrylate, acrylic anhydride, acrylamide, vinyl, vinyl ether, vinyl ester, vinyl halide, vinyl silane, vinyl siloxane, (meth)acrylated silicones, vinyl heterocycles, diene, allyl and the like. Other less known but polymerizable functional groups can be investigated, such as epoxies (with hardeners) and urethanes (reaction between isocyanates and alcohols). In principle, any monomers may be used as reactive plasticizers in accordance with the present invention, although preference is given to those which exist as liquids at ambient temperatures or slightly above, and which polymerize readily with the application of a source of polymerizing energy such as light or heat in the presence of a suitable initiator.

Reactive monomers, oligomers, and crosslinkers that contain acrylate or methacrylate functional groups are well known and commercially available from Sartomer, Radcure and Henkel. Similarly, vinyl ethers are commercially available from Allied Signal. Radcure also supplies UV curable cycloaliphatic epoxy resins. Photo-initiators such as the Irgacure and Darocur series are well-known and commercially available from Ciba Geigy, as is the Esacure series from Sartomer. Thermal initiators such as azobisisobutyronitrile (AIBN), benzoyl peroxide, dicumyl peroxide, t-butyl hydroperoxide, and potassium persulfate are also well known and are available from chemical suppliers such as Aldrich. Vinyl, diene, and allyl compounds are available from a large number of chemical suppliers, as is benzophenone. For a reference on initiators, see, for example, Polymer Handbook, J. Brandrup, E. H. Immergut, eds., $3^{rd}$ Ed., Wiley, N.Y., 1989. Below we will use acrylates (and in a few cases, methacrylates) to illustrate the flexibility of our formulation approach. Similar structures with other reactive groups based on either small or large molecule architectures (such as acrylamides, vinyl ethers, vinyls, dienes, and the like) can be used in conjunction with the disclosed casting process.

The compatibility of dead polymer-reactive plasticizer mixtures is demonstrated by checking the optical transparency of the resulting material at room temperature or slightly above, as illustrated by Example 1 below. To demonstrate the great diversity of reactive plasticizers that can be used to achieve such compatibility, we will name only a few from a list of hundreds to thousands of commercially available compounds. For example, mono-functional entities include, but are not limited to: isodecyl acrylate, hexadecyl acrylate, stearyl acrylate, isobornyl acrylate, vinyl benzoate, tetrahydrofurfuryl acrylate (or methacrylate), caprolactone acrylate, cyclohexyl acrylate, methyl methacrylate, ethyl acrylate, propyl acrylate, and butyl acrylate, etc. Bi-functional entities include, but are not limited to: polyethyleneglycol diacrylate, polypropyleneglycol diacrylate, hexanediol diacrylate, Photomer 4200 (from Henkel), polybutadiene diacrylate (or dimethacrylate), Ebecryl 8402 (from Radcure), bisphenol A diacrylate, ethoxylated (or propoxylated) bisphenol A diacrylate. Tri-functional and multi-functional entities include, but are not limited to: trimethylolpropane triacrylate (and its ethoxylated or propoxylated derivatives), pentaerythritol tetraacrylate (and its ethoxylated or propoxylated derivatives), Photomer 6173 (a proprietary acrylated oligomer of multi functionality, from Henkel), and a whole host of aliphatic and aromatic acrylated oligomers from Sartomer (the SR series), Radcure (the Ebecryl series), and Henkel (the Photomer series).

When high refractive index materials are desired, the reactive plasticizers may be chosen accordingly to have high refractive indices. Examples of such reactive plasticizers, in addition to those mentioned above, include brominated or chlorinated phenyl (meth)acrylates (e.g., pentabromo methacrylate, tribromo acrylate, etc.), brominated or chlorinated naphthyl or biphenyl (meth)acrylates, brominated or chlorinated styrenes, tribromoneopentyl (meth)acrylate, vinyl naphthylene, vinyl biphenyl, vinyl phenol, vinyl carbazole, vinyl bromide or chloride, vinylidene bromide or chloride, bromoethyl (meth)acrylate, bromophenyl isocyanate, etc.

The following examples are provided to illustrate the practice of the present invention, and are intended neither to define nor to limit the scope of the invention in any manner.

The Examples 1 to 8 below are designed to discover pairs of materials that exhibit thermodynamic compatibility prior to polymerization. Examples 9 to 11 show systems that remain optically clear upon photocuring, and further illustrate material systems exhibiting high refractive indices. Tertiary, quaternary, and multi-component mixtures can be formulated based on knowledge gleaned from binary experiments. Generally, diluents that are small molecules have a higher degree of shrinkage. But, they are also typically better plasticizers. On the contrary, oligomeric plasticizers shrink less, but they also show less solvation power and less viscosity reduction. Hence, mixtures of reactive plasticizers can be prepared to give optimized compatibility, processing, and shrinkage properties. Examples 12 to 17 provide exemplary composite lenses which may be prepared according to this invention.

Example 1

Experimental Protocol

Dead polymers are added to a vial, pre-filled with a small quantity of the intended reactive plasticizer. Gentle heating is applied while stirring homogenizes the mixture. The resulting semi-solid-like mass is observed visually and optical transparency at various temperatures is recorded. Complete clarity is indicative of component miscibility. A faint haze suggests partial miscibility, and opacity equates to incompatibility (light scattering as a result of phase separation). Many pairs of dead polymer-reactive plasticizers can thus be investigated.

Examples 2 to 8 report several findings of system compatibility and partial compatibility, following this procedure.

Example 2

Kraton-Based Systems

The following polymers were studied using the protocol described in Example 1. The accompanying table summarizes the polymer characteristics.

TABLE 1

| Krayton type | Composition (%) | Description |
|---|---|---|
| G 1652 | SEBS (S:29/EB:71) | linear, low molecular weight |
| G 1650 | SEBS (S:29/EB:71) | linear, medium Mw |
| G 1657 | SEBS (S:13/EB:87) | linear |
| D 1102 | SBS (S:28/B:72) | linear, low Mw |
| D 4141 | SBS (S:31/B:69) | linear |
| D 4240p | $(SB)_n$ (S:44/B:56) | branched |
| D 1116 | $(SB)_n$ (S:21/B:79) | branched |
| D 1107 | SIS (S:14/I:86) | linear |

S = styrene, EB = ethylene butylene, B = butadiene, I = isoprene

Hexanediol diacrylate solvates all Kraton samples well except for G 1650, which shows partial miscibility. Photomer4200 solvates D1102, D1107, D4141, D4240p, and G1657 at elevated temperatures. Photomer 4200 (an oligomeric diacrylate) solvates G 1652 partially. Polybutadiene dimethacrylate (Sartomer CN301) solvates D1116, D1102, and D4141 partially at elevated temperatures. Ebecryl 8402 solvates G 1657. Isodecyl acrylate is compatible with all of the above Kratons. Hexadecyl acrylate, lauryl acrylate, and stearyl acrylate solvate Kraton at elevated temperatures.

Other monomers that solvate Kraton include butyl acrylate, isooctyl acrylate, isobornyl acrylate, benzyl acrylate, tetrahydrofurfuryl acrylate, and vinyl benzoate. In general, aliphatic acrylates solvate rubbery Kraton well. Ethoxylated bisphenol A diacrylate (average molecular weight of 424) solvates Kraton D4240p, D1107, D4141, and D1102 only slightly.

Example 3

Styrene-Rich SBS Systems

Kraton D1401P is a linear styrene-rich SBS tri-block copolymer. Reactive plasticizers that solvate Kraton D1401 P include: vinyl benzoate; tetrahydrofurfuryl acrylate; benzyl (meth)acrylate; isobornyl (meth)acrylate; butyl acrylate; octyl acrylate; isodecyl acrylate; butanediol diacrylate; hexanediol diacrylate; ethoxylated bisphenol A diacrylate; and trimethylolpropane triacrylate. Sulfur-containing monomers such as phenylthioethyl acrylate and others also solvate SBS-based polymers well. A further benefit of the sulfur-containing monomers is that their incorporation results in a higher Abbe number of the cured resin.

To obtain thermodynamically compatible systems containing styrene-rich SBS tri-block copolymers, Kraton D1401 P can be replaced by other SBS copolymers such as those that are commercially available from Phillips Chemical Company (K-Resin), BASF (Styrolux), Fina Chemicals (Finaclear), and Asahi Chemical (Asaflex).

Example 4

PMMA-Based Systems

This study is conducted with a polymethyl methacrylate (PMMA) sample of molecular weight 25,000. Many reactive plasticizers have been found compatible with PMMA. These are: Photomer 4200; Photomer 6173; many alkoxylated multifunctional acrylate esters, such as propoxylated glycerol triacrylate; urethane acrylates, such as Ebecryl 8402 (aliphatic) and Ebecryl 4827, 4849 and 6700 (aromatic); tetrahydrofurfuryl acrylate; benzyl acrylate; butyl acrylate; butanediol diacrylate; hexanediol diacrylate; octyldecyl acrylate; isobornyl acrylate; and ethoxylated bisphenol A diacrylate.

Example 5

Polystyrene-Based Systems

Acrylated plasticizers that solvate polystyrene include Photomer 4200, tetrahydrofurfuryl acrylate, isodecyl acrylate. Bisphenol A diacrylate, hexadecyl acrylate, and stearyl acrylate exhibit compatibility at elevated temperatures (approximately 100° C. for example).

Example 6

Polycarbonate-Based Systems

Bisphenol A diacrylate, alkoxylated bisphenol A diacrylate, cycloaliphatic epoxy resin, N-vinyl-2-pyrrolidinone, and tetrahydrofurfuryl acrylate, among others, have been found useful for the solvation of polycarbonate at elevated temperature. Several aromatic urethane acrylates can be mixed with the above compounds to aid the compatibility of the ingredients.

Example 7

ARTON-Based Systems

Reactive plasticizers that solvate ARTON FX4727T1 (JSR Corporation) are: benzyl acrylate; isobornyl acrylate; isobornyl methacrylate; butyl acrylate; octyl acrylate; isooctyl acrylate; isodecyl acrylate; lauryl acrylate; behenyl acrylate. Aliphatic acrylates solvate ARTON very well.

Example 8

ZEONEX-Based Systems

Octyldecyl acrylate, butyl acrylate, and isooctyl acrylate solvate Zeonex 480R (Nippon Zeon Co., Ltd). Isobornyl (meth)acrylate solvates Zeonex 480R and E48R, and Zeonor 1420R, 1020R and 1600R. Lauryl acrylate and behenyl acrylate solvate ZEONEX 480R and E48R at elevated temperature. Additional multifunctional acrylates that can be added to a mixture of monomers include hexanediol diacrylate, dodecanediol dimethacrylate, and tricyclo [5.2.1.0(2,6)] decanedimethanol diacrylate.

Example 9

Transparent Photo-cured Systems

Mixtures containing the dead polymer, reactive plasticizer, and photoinitiator were mixed by the protocol described in Example 1. The amount of reactive plasticizer was typically 3% to 25% and the photoinitiator was 1% to 5% by weight. Example photoinitiators include Esacure KT046 from Sartomer and Irgacure 184 from Ciba Geigy.

The resulting semi-solid composition was slightly heated (less than or equal to about 100° C.), pressed between flat glass plates, and flood-exposed by UV light. Rapid polymerization was observed that led to a clear and solid-like material.

The examples of transparent photo-cured systems included: Kraton D1401 P-based systems reported by Example 3; PMMA-based systems reported by Example 4; ARTON-based systems reported by Example 7. Kraton D1401P-based systems also showed exceptional impact-resistance.

Example 10

Transparent Photo-cured Systems Having a High Refractive Index

A mixture containing a dead polymer, reactive plasticizer, and photoinitiator was mixed by the protocol described in Example 1, and was processed further as described in Example 9. The dead polymer was Kraton D1401 P and the reactive plasticizer was benzyl acrylate, mixed at a ratio by weight of 88/12. Irgacure 184 was added to the mixture at 2 wt % based on the overall weight of the system. Upon UV cure, a flat sample having a thickness of 2.4 millimeters was produced, which showed 88% light transmittance at a wavelength of 700 nm. The refractive index of the cured sample was 1.578 at the sodium D line at room temperature.

Example 11

Transparent Systems Utilizing a Waiting Period and Compression Molding

A styrene-butadiene-styrene block copolymer, K-Resin KR03-NW (Chevron-Phillips Chemical Company, Bartlesville, Okla.) was physically mixed with a styrene-methyl methacrylate copolymer, NAS-21 ( Nova Chemicals of Chesapeake, Va.) at a weight ratio of 30:70. The polymers and a monomer mixture were added into a vial at a weight ratio of 80:20. The monomer mixture consisted of a 9:1 blend of benzyl methacrylate ("BMA") and ethoxylated bisphenol A dimethacrylate (1 degree of ethoxylation). The capped vial was allowed to sit in a convection oven at 70° C. for one week, after which an initiator (Darocur 1173 from Ciba Geigy) was added to the mixture at 0.5 wt % (based on the overall weight of the system), and was dissolved into the system while heating and mixing manually using a hotplate set to about 150° C.

To mold the sample into a defect-free disc shape, approximately 5 g rams of the semi-solid mixture was placed in the middle of a gasket (gasket type AS568A, dash #222 from McMaster-Carr) sitting on one face of a compression mold from Carver, Inc. (Catalog No. 2091.2). The mold was closed and transferred into a hydraulic press having heated platens at about 270° F. About 7 tons of force was then applied to the platens for 10 minutes. After compression, the platens were cooled rapidly to ambient temperature using process water. The compression mold was disassembled and a bubble-free disc measuring approximately 2 mm thick and 55 mm in diameter was removed. The disc was then placed between heated quartz plates, which were then compressed slightly, causing the semi-solid disc to conform to the surfaces of the quartz plates. The assembly was then placed on a hotplate measuring 90° C., and a UV light was positioned immediately over the top quartz plate to cure the semi-solid disc.

The UV light source was a Blak-Ray Model B 100AP Longwave Ultraviolet Lamp, with flood bulb (UVP, Upland, Calif.). After about 10 minutes of curing, the sample and plates were removed from the hotplate and allowed to cool to room temperature. The sample was then removed from the plates, yielding a disc-shaped cured resin exhibiting good light transmission and a shore D hardness measurement in the range of 83–84.

Example 12

Semi-solid Preform for Composite Lens

About 0.36 g BMA and 0.04 g ethoxylated Bisphenol A Dimethacrylate ("BisADMA"—SR348 from Sartomer) were mixed in a vial. 1.6 Grams of a 30:70 blend of K-Resin KR03-NW and NAS-21 were added to the vial, and the mixture was stirred such that all the polymer particles were covered with the reactive plasticizers. The final composition in the vial was: 80 wt % polymer and 20 wt % reactive plasticizer. Many vials were prepared in this manner, capped, and placed in an oven at 70° C. and left for several days to one week in order to allow for the plasticizers to solvate the polymer.

After this period, the mixture was removed from the vials and homogenized by mixing with a spatula on a hot plate at 150° C. Approximately 1 wt % of the photoinitiator Darocur 1173 (Ciba Geigy) was added and mixed into the semi-solid system. Approximately 18 g of material mixed in the manner described above was transferred onto a Teflon sheet (100 mm×100 mm) that was resting on a stainless steel tile (150 mm×150 mm). A 3-inch inner diameter, 5-mm thick steel shim was placed around the sample, inside of which was a 2.25" inner diameter, 3/16" thick Buna-N o-ring. The sample was then sandwiched by placing another Teflon sheet on top of it, followed by another stainless steel tile. All of these parts are available from McMaster-Carr Supply Company. The steel tiles were then placed in a Carver hydraulic press (model# 3912), fitted with heated platens that were set to 240° F. 5000 Pounds force was applied to the sample for 10 minutes, after which it was cooled down to 60° F. by running water through the cooling channels in the platens. The pressure was released, and a semi-solid polymer disc was removed from the tiles measuring approximately 70 mm diameter and 5 mm thick.

Example 13

A Multi-focal Composite Lens Formed from a Semi-finished Polycarbonate Lens Substrate and a Front Semi-Solid Superstrate Layer The disc-shaped preform from Example 12 was used as the superstrate. A semi-finished polycarbonate lens with a base curve of 6.25 on the front surface was used as the substrate. The semi-finished polycarbonate lens was soaked in 5% KOH overnight in order to treat the anti-scratch coating on the surface to promote adhesion of the superstrate layer. A glass mold with a base curve of 6.25 and a bi-focal add pocket was used as the mold for the front surface of the composite lens. In order to facilitate mold release, the glass mold was treated with Relisse 2520 (Nanofilm, Ltd., Valley View, Ohio), following the manufacturer's instructions. The preform was placed between the front lens mold and the polycarbonate semi-finished lens. The front lens mold/preform/polycarbonate lens sandwich was then placed in a Carver hydraulic press, fitted with temperature-controlled top and bottom platens that were set to 210° F. Slight positive pressure was applied (no greater than 1 pound force) while the preform softened due to the heat provided by the platens. Upon compression, the semi-solid preform filled in the cavity between the mold surface and polycarbonate substrate, including the bi-focal pocket area, flowing radially outward from the center toward the edges. No defects were observed. The resulting semi-solid superstrate layer was about 1 mm thick in the area outside of the bifocal pocket.

The substrate-superstrate-mold sandwich was then removed from the mold, placed on a hotplate set to approximately 90° C., and cured with ultraviolet light projected through the lens mold. The UV light source was a Blak-Ray Model B 100AP Longwave Ultraviolet Lamp, with flood bulb (from UVP, Upland, Calif.). Curing proceeded for about 10 minutes, during which time the semi-solid superstrate hardened and fused with the polycarbonate substrate, forming a composite lens structure that was then cooled to room temperature. The polycarbonate blank/cured resin sandwich was then separated from the front lens mold, yielding a composite lens consisting of a previously semi-solid superstrate adhered to a semi-finished polycarbonate lens substrate.

The composite lens was edged with no signs of delamination between the two layers. The composite lens was also immersed alternately between a water bath at 95° C. for 5 minutes and a water bath at about 0° C. for 5 minutes, all with no signs of delamination of the layers.

Example 14

A Photochromic Composite Lens Formed from a Finished Polycarbonate Lens Substrate and a Front Semi-solid Superstrate Layer Photochromic dye (e.g., "Thunderstorm Purple" from James Robinson) was solvated at 1 wt % concentration in the reactive plasticizer isobornyl methacrylate ("IBMA"—SR 423A, Sartomer). The resulting dye solution was then filtered to remove any macro-particles.

About 0.1 g of the dye solution was added to a scintillation vial already containing 0.1 g IBMA and 0.2 g ethoxylated Bisphenol A Dimethacrylate (BisADMA—SR348, Sartomer) as additional reactive plasticizers, and was stirred to disperse the dye throughout the mixture. 1.6 Grams of K-Resin KR03-NW were added to the vial, and the mixture was stirred such that all the polymer particles were covered with the reactive plasticizers. The final composition in the vial was: 80 wt % polymer, 20 wt % reactive plasticizer, with the dye present at 0.05 wt % of the total weight. Approximately 8 grams of the material was then processed according to the procedure of Example 12 to form a semi-solid preform containing a photochromic dye and measuring about 70 mm in diameter and 2 mm thick.

The preform was then processed as described in Example 13, except that a piano, finished polycarbonate single vision lens was used as the back substrate. The polycarbonate substrate was approximately 1 mm thick, had a base curve of 6.00, and had not been treated with an anti-scratch coating on either surface, and therefore, no KOH treatment was used. Also, a spherical front lens mold having a base curve of approximate 6.25 was used to shape the outer surface of the semi-solid preform during molding. The result was a composite lens consisting of a previously semi-solid, photochromic dye-containing superstrate (approximately 1 mm thick) adhered to a finished polycarbonate lens substrate, said composite lens being about 2 mm in thickness.

The sample could be moved between hot and cold water baths and could be edged with no signs of delamination between the superstrate and substrate layers. Exposure to sunlight effected a photochromic response that darkened the lens, and the photochromic response reversed upon removal from direct sunlight.

Example 15

A Photochromic Composite Lens Formed from a Semi-finished Polycarbonate Lens Substrate and a Front Semi-solid Superstrate Layer The procedure of Example 14 was followed except that an anti-scratch coated polycarbonate semi-finished lens was used as the substrate. The substrate was treated with KOH as in Example 13. The resultant composite lens comprised a photochromic superstrate layer approximately 1 mm thick bonded to the polycarbonate semi-finished lens. The composite again showed good adhesion properties, as well as a reversible photochromic response in sunlight.

Example 16

A Photochromic Composite Lens Formed from a Semi-finished CR-39 Lens Substrate and a Front Semi-solid Superstrate Layer The procedure of Example 14 was followed except that an uncoated CR-39 semi-finished lens was used as the substrate. The substrate was not treated with KOH. The resultant composite lens comprised a photochromic superstrate layer approximately 1 mm thick bonded to the CR-39 semi-finished lens. The composite again showed good adhesion properties, as well as a reversible photochromic response in sunlight.

Example 17

A Composite Lens formed from Two Polycarbonate Substrates and a Center Semi-Solid Layer A semi-solid composition is formed by mixing Kraton D4240P and tetrahydrofurfural acrylate in a ratio of 4:1. A UV initiator, Irgacure 184, is added at 2 wt %. A first or front polycarbonate substrate is obtained which has a plano, base 4.5 curve on the front and back surfaces, and a +2 bifocal pocket molded into the front surface. A second or back polycarbonate substrate is also obtained having a base curve of 6.5 on the front and back surfaces (for −2 diopter correction relative to the surface of the lens mold) and an imposed ½ diopter cylinder to give a toroidal back surface. The polycarbonate substrates are rotated so as to align the toroidal back surface with the bifocal pocket to give a cylinder angle of zero degrees. The semi-solid composition is placed near the center of the front polycarbonate substrate on its concave side, and the two substrates are then compressed together so that the semi-solid fills in the cavity between them by flowing from the center outward towards the edges of the substrates. Ultraviolet light is then projected through the front and back substrates to cure the semi-solid material. The resulting composite lens consists of front and back polycarbonate substrates, with the cured resin in between them bonding the two substrates together. The lens has a bifocal pocket built into the front surface and an aligned toroidal back surface for astigmatic correction. Note: the cylinder alignment can be easily adjusted to form a lens with other desired degrees of rotation by simply rotating the back substrate relative to the front substrate prior to compression of the semi-solid material. The resulting lens is also extremely impact resistant.

What is claimed is:

1. A composite article, comprising at least one substrate and at least one layer of a cured resin bonded to the substrate, the cured resin comprising a crosslinked polymer network of reactive plasticizer within a substantially fully polymerized, generally non-reactive dead polymer.

2. A composite article according to claim 1 wherein the reactive plasticizer is further crosslinked to the dead polymer.

3. A composite article according to claim 1 wherein the cured resin is a semi-solid prior to cure.

4. A composite article, comprising at least one substrate and at least one layer of a cured resin bonded to the substrate, the cured resin being formed from a semi-solid polymerizable material comprising a reactive plasticizer and a substantially fully polymerized, generally non-reactive polymer.

5. A composite article according to claim 4 wherein the generally non-reactive polymer is selected from the group consisting of thermoplastics, thermosets, thermoplastic elastomers, and high performance engineering thermoplastics.

6. A composite article according to claim 4 wherein the substrate and the cured resin form an integral monolithic entity.

7. A composite article according to claim 4 wherein the cured resin exhibits low shrinkage upon cure.

8. A composite article according to claim 4 wherein the cured resin exhibits a refractive index within about 0.05 units of the refractive index of the substrate.

9. A composite article according to claim 4 which is an optical lens.

10. A composite article according to claim 9 which is an ophthalmic lens.

11. A composite article according to claim 9 which is a contact lens.

12. A composite article according to claim 9 which is a lens and wherein the substrate is selected from the group consisting of optical quality glasses, photochromic glasses, bisallyl carbonates, polycarbonates, polysulfones, polyphenylene oxides, polyethylene terephthalates, polybutylene terephthalates, polystyrenes, poly (meth)acrylates, acrylonitrile-butadiene-styrene copolymers, polystyrene-co-butadiene copolymers, polystyrene-co-isoprene copolymers, polycyclohexylethylene, polycyclohexylethylene-co-butadiene copolymers, polyolefins, polyolefin copolymers, polyurethanes, and thermoplastic elastomers.

13. A composite article according to claim 4 which comprises a cured resin front layer bonded to a back substrate.

14. A composite article according to claim 13 which is a lens and wherein the substrate has a toroidal back surface, and the cured resin layer has a multi-focal front surface.

15. A composite article according to claim 4 which comprises a front substrate bonded to a cured resin back layer.

16. A composite article according to claim 15 which is a lens and wherein the substrate has a multi-focal front surface, and the cured resin layer has a toroidal-shaped back surface.

17. A composite article according to claim 4 which comprises a cured resin front layer, a middle substrate, and a cured resin back layer.

18. A composite article according to claim 17 which is a lens and wherein the substrate is a polarizing film.

19. A composite article according to claim 17 which is a lens and wherein the cured resin front layer has a multi-focal front surface, and the cured resin back layer has a toroidal-shaped back surface.

20. A composite article according to claim 4 wherein at least one of the cured resin layers further comprises a scratch-resistant surface.

21. A composite article according to claim 4 which comprises a front substrate, a cured resin middle layer, and a back substrate.

22. A composite article according to claim 9 which is a multi-focal lens incorporating astigmatic corrections.

23. A composite article according to claim 4 wherein the cured resin further comprises a photochromic dye or pigment.

24. A composite article according to claim 23 wherein the substrate is polycarbonate.

25. A composite article according to claim 1 wherein the substrate is polycarbonate and the cured resin further comprises a photochromic dye or pigment.

26. A composite article according to claim 4 wherein the substrate is polycarbonate.

27. A composite article according to claim 9 which is a polychromic lens.

28. A composite article according to claim 4 which further comprises a surface-modifying material on a surface of the cured resin layer, wherein the composition of the surface-modifying material is distinct from the composition of the cured resin and wherein the surface and the cured resin are an integral, monolithic entity.

29. A composite article according to claim 28 wherein the surface material is selected from the group consisting of a material that imparts scratch resistance, a dye, a pigment, low-refractive index monomers, anti-static monomers, and heterofunctional additives.

30. A composite article according to claim 29 wherein the dye or pigment is selected from the group consisting of photochromic, fluorescent, UV-absorbing, and visible (color).

31. A composite article according to claim 4 which further comprises a semiconducting material between at least part of the cured resin and the substrate.

32. A composite article according to claim 4 wherein the cured resin further comprises liquid crystalline polymers.

33. A composite lens obtained by a process comprising the steps of:
  a) obtaining a substrate;
  b) placing a semi-solid polymerizable material in contact with at least one of the front or back surface of the substrate, the semi-solid polymerizable material comprising a reactive plasticizer, an initiator and a substantially fully polymerized, generally non-reactive polymer, to give a semi-solid/substrate sandwich;
  c) compressing the semi-solid/substrate sandwich between two mold halves while optionally heating the semi-solid polymerizable material, and wherein the portion of the mold contacting the semi-solid polymerizable material has a desired surface geometry; and
  d) exposing the semi-solid/substrate sandwich to a source of polymerizing energy to cure the semi-solid material, to bond the substrate and the semi-solid material together, and to harden the semi-solid material;
to give a composite lens comprising a substrate and at least one layer of a cured resin bonded to the substrate, wherein the cured resin comprises a crosslinked polymer network of reactive plasticizer within a substantially fully polymerized, generally non-reactive polymer.

34. A composite lens obtained by a process comprising the steps of:
  a) obtaining a front substrate lens and a back substrate lens;
  b) placing a semi-solid polymerizable material between the front and back substrate lenses, the semi-solid polymerizable material comprising a reactive plasticizer, an initiator and a substantially fully polymerized, generally non-reactive polymer, to form a sandwich of the substrate lenses having a layer of the semi-solid polymerizable material between the lenses;
  c) compressing the front and back substrate lenses of the sandwich together, while optionally heating the semi-solid polymerizable material; and
  d) exposing the sandwich to a source of polymerizing energy to cure the semi-solid material and to bond the two substrate lenses and the semi-solid material together;
to give a composite lens comprising a front substrate portion and a back substrate portion and a layer of a cured resin bonded between the two substrate portions, wherein the cured resin comprises a crosslinked polymer network of reactive plasticizer within a substantially fully polymerized, generally non-reactive polymer.

35. A semi-solid polymerizable material comprising a reactive plasticizer and an optically clear substantially fully polymerized, generally non-reactive polymer, wherein the polymerizable composition remains optically clear and exhibits low shrinkage when polymerized.

36. A polymerizable composition according to claim 35 wherein the generally non-reactive polymer is selected from the group consisting of thermoplastics, thermosets, thermoplastic elastomers, and high performance engineering thermoplastics.

37. A polymerizable composition according to claim 35 wherein the generally non-reactive polymer is chosen from the group consisting of polycarbonates and halogenated polycarbonates, polystyrenes and halogenated polystyrenes, polystyrene-polybutadiene block copolymers, hydrogenated polystyrene-polybutadiene block copolymers, halogenated polystyrene-polybutadiene block copolymers, polystyrene-polyisoprene block copolymers, hydrogenated polystyrene-polyisoprene block copolymers, halogenated polystyrene-polyisoprene block copolymers, poly(pentabromophenyl (meth)acrylate), polyvinyl carbazole, polyvinyl naphthalene, poly vinyl biphenyl, polynaphthyl (meth)acrylate, polyvinyl thiophene, polysulfones, polyphenylene sulfides, urea-formaldehyde resins, phenol-formaldehyde resins, naphthyl-formaldehyde resins, polyvinyl phenol, poly(phenyl $\alpha$- or $\alpha$-bromoacrylate), polyvinylidene chloride, and polyvinylidene bromide.

38. A polymerizable composition according to claim 35 wherein the reactive plasticizer comprises at least one reactive functional group, the reactive functional group selected from the group consisting of acrylate, methacrylate, acrylic anhydride, acrylamide, vinyl, vinyl ether, vinyl ester, vinyl halide, vinyl silane, vinyl siloxane, acrylated silicones, methacrylated silicones, vinyl heterocycles, diene, allyl, epoxies with hardeners, and urethanes.

* * * * *